(12) United States Patent
Ronen et al.

(10) Patent No.: US 12,019,249 B2
(45) Date of Patent: Jun. 25, 2024

(54) OPTICAL SYSTEMS AND METHODS FOR EYE TRACKING BASED ON REDIRECTING LIGHT FROM EYE USING AN OPTICAL ARRANGEMENT ASSOCIATED WITH A LIGHT-GUIDE OPTICAL ELEMENT

(71) Applicant: Lumus Ltd., Ness Ziona (IL)

(72) Inventors: Eitan Ronen, Rechovot (IL); Ronen Chriki, Lod (IL); Naamah Levin, Rehovot (IL); Lilya Lobachinsky, Tel Aviv (IL)

(73) Assignee: LUMUS LTD., Ness Ziona (IL)

( * ) Notice: Subject to any disclaimer, the term of this patent is extended or adjusted under 35 U.S.C. 154(b) by 151 days.

(21) Appl. No.: 17/789,196

(22) PCT Filed: Nov. 30, 2020

(86) PCT No.: PCT/IL2020/051236
§ 371 (c)(1),
(2) Date: Jun. 26, 2022

(87) PCT Pub. No.: WO2021/130739
PCT Pub. Date: Jul. 1, 2021

(65) Prior Publication Data
US 2022/0357583 A1    Nov. 10, 2022

Related U.S. Application Data

(60) Provisional application No. 62/953,557, filed on Dec. 25, 2019, provisional application No. 62/958,755, (Continued)

(51) Int. Cl.
*G02B 27/01*    (2006.01)
*G02B 6/42*    (2006.01)
(Continued)

(52) U.S. Cl.
CPC .......... *G02B 27/0179* (2013.01); *G02B 6/42* (2013.01); *G02B 6/4214* (2013.01);
(Continued)

(58) Field of Classification Search
CPC .... G02B 27/0179; G02B 6/42; G02B 6/4214; G02B 27/0101; G02B 27/0172;
(Continued)

(56) References Cited

U.S. PATENT DOCUMENTS

| 3,969,023 A | 7/1976 | Brandt et al. |
| 4,720,189 A | 1/1988 | Heynen et al. |

(Continued)

FOREIGN PATENT DOCUMENTS

| CN | 101311772 A | 11/2008 |
| CN | 104570353 A | 4/2015 |

(Continued)

OTHER PUBLICATIONS

C.B. Owen et al "Display-relative calibration for optical see-through head-mounted displays" Published in: Third IEEE and ACM International Symposium on Mixed and Augmented Reality— https://ieeexplore.ieee.org/document/1383044.

(Continued)

*Primary Examiner* — Michael E Teitelbaum
(74) *Attorney, Agent, or Firm* — Rivka Friedman

(57) ABSTRACT

A light-transmitting substrate has at least two major surfaces and is deployed with a first of the major surfaces in facing relation to an eye of a viewer. A light redirecting arrangement is associated with the light-transmitting substrate and deflects light from the eye toward an optical sensor that senses light, such that the light deflection occurs at the light-transmitting substrate and the deflected light that reaches the optical sensor is unguided by the light-transmit- (Continued)

ting substrate. A processor derives current gaze direction of the eye by processing signals from the optical sensor.

18 Claims, 10 Drawing Sheets

Related U.S. Application Data filed on Jan. 9, 2020, provisional application No. 63/023,891, filed on May 13, 2020.

(51) Int. Cl.
  *G06F 3/01* (2006.01)
  *H04N 23/56* (2023.01)

(52) U.S. Cl.
  CPC ..... *G02B 27/0101* (2013.01); *G02B 27/0172* (2013.01); *G06F 3/013* (2013.01); *H04N 23/56* (2023.01); *G02B 2027/0178* (2013.01); *G02B 2027/0187* (2013.01)

(58) Field of Classification Search
  CPC .... G02B 2027/0178; G02B 2027/0187; G02B 27/0081; G02B 27/0093; G02B 2027/0138; G02B 27/017; G02B 6/0011; G02B 6/0035; G06F 3/013; H04N 23/56
  See application file for complete search history.

(56) References Cited

U.S. PATENT DOCUMENTS

| | | |
|---|---|---|
| 6,215,460 B1 | 4/2001 | Mizoguchi et al. |
| 6,239,771 B1 | 5/2001 | Usuki et al. |
| 6,268,883 B1 | 7/2001 | Zehnder et al. |
| 6,580,529 B1 | 6/2003 | Amitai et al. |
| 6,879,443 B2 | 4/2005 | Spitzer et al. |
| 7,612,879 B2 | 11/2009 | Stumpe et al. |
| 7,724,409 B2 | 5/2010 | Lin et al. |
| 7,872,217 B2 | 1/2011 | Kasahara |
| 8,016,428 B2 | 9/2011 | Kasazumi et al. |
| 8,405,573 B2 | 3/2013 | Lapidot et al. |
| 9,311,883 B2 | 4/2016 | Cajigas et al. |
| 9,509,939 B2 | 11/2016 | Henion et al. |
| 9,569,897 B2 | 2/2017 | Miyawaki et al. |
| 9,638,920 B2 | 5/2017 | Bohn |
| 9,804,396 B2 | 10/2017 | Amitai |
| 11,425,829 B2 | 8/2022 | Zheng et al. |
| 2003/0165017 A1 | 9/2003 | Amitai |
| 2004/0032660 A1 | 2/2004 | Amitai |
| 2004/0033528 A1 | 2/2004 | Amitai |
| 2004/0080718 A1 | 4/2004 | Kojima |
| 2004/0212775 A1 | 10/2004 | Hunter et al. |
| 2005/0078388 A1 | 4/2005 | Amitai |
| 2005/0083592 A1 | 4/2005 | Amitai |
| 2005/0180687 A1 | 8/2005 | Amitai |
| 2005/0281515 A1 | 12/2005 | Togami |
| 2007/0091445 A1 | 4/2007 | Amitai |
| 2007/0097513 A1 | 5/2007 | Amitai |
| 2007/0155277 A1 | 7/2007 | Amitai |
| 2007/0159673 A1 | 7/2007 | Freeman et al. |
| 2007/0165192 A1 | 7/2007 | Prior |
| 2008/0025667 A1 | 1/2008 | Amitai |
| 2008/0106775 A1 | 5/2008 | Amitai et al. |
| 2008/0151379 A1 | 6/2008 | Amitai |
| 2008/0186604 A1 | 8/2008 | Amitai |
| 2008/0192239 A1 | 8/2008 | Otosaka |
| 2008/0198471 A1 | 8/2008 | Amitai |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2010/0077049 A1 | 3/2010 | Appelman et al. |
| 2010/0110368 A1 | 5/2010 | Chaum |
| 2010/0134534 A1 | 6/2010 | Seesselberg et al. |
| 2010/0171680 A1 | 7/2010 | Lapidot et al. |
| 2010/0202048 A1 | 8/2010 | Amitai |
| 2010/0214635 A1 | 8/2010 | Sasaki et al. |
| 2011/0050547 A1 | 3/2011 | Mukawa |
| 2011/0176218 A1 | 7/2011 | Noui |
| 2011/0304828 A1 | 12/2011 | Khechana |
| 2012/0062445 A1 | 3/2012 | Haddick et al. |
| 2012/0179369 A1 | 7/2012 | Lapidot et al. |
| 2013/0022220 A1 | 1/2013 | Dong et al. |
| 2013/0128230 A1 | 5/2013 | Macnamara |
| 2013/0229717 A1 | 9/2013 | Amitai |
| 2013/0276960 A1 | 10/2013 | Amitai |
| 2013/0279017 A1 | 10/2013 | Amitai |
| 2014/0027232 A1 | 1/2014 | Mccollum |
| 2014/0014065 A1 | 5/2014 | Brown et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0198017 A1* | 7/2014 | Lamb .................. G02B 27/017 345/8 |
| 2015/0070864 A1 | 3/2015 | Rainer et al. |
| 2015/0138451 A1 | 5/2015 | Amitai |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0233824 A1 | 8/2015 | Richards et al. |
| 2015/0277127 A1 | 10/2015 | Amitai |
| 2015/0293360 A1 | 10/2015 | Amitai |
| 2015/0035481 A1 | 12/2015 | Hilkes et al. |
| 2015/0355481 A1 | 12/2015 | Hilkes et al. |
| 2016/0012643 A1 | 1/2016 | Kezele et al. |
| 2016/0018639 A1 | 1/2016 | Spitzer et al. |
| 2016/0018654 A1 | 1/2016 | Haddick et al. |
| 2016/0062119 A1 | 3/2016 | Fitch et al. |
| 2016/0116743 A1 | 4/2016 | Amitai |
| 2016/0125642 A1 | 5/2016 | Zhu et al. |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0020965 A1 | 7/2016 | Popovich et al. |
| 2016/0247319 A1 | 8/2016 | Nowatzyk et al. |
| 2016/0278695 A1 | 9/2016 | Wang et al. |
| 2016/0282616 A1 | 9/2016 | Matsushita |
| 2016/0314564 A1 | 10/2016 | Jones |
| 2016/0341964 A1 | 11/2016 | Amitai |
| 2016/0349518 A1 | 12/2016 | Amitai et al. |
| 2017/0003504 A1 | 1/2017 | Vallius |
| 2017/0007351 A1 | 1/2017 | Yu |
| 2017/0045744 A1 | 2/2017 | Amitai |
| 2017/0052376 A1 | 2/2017 | Amitai |
| 2017/0052377 A1 | 2/2017 | Amitai |
| 2017/0122725 A1 | 5/2017 | Yeoh |
| 2017/0130224 A1 | 5/2017 | Oestergaard et al. |
| 2017/0132757 A1 | 5/2017 | Thiebaud et al. |
| 2017/0146802 A1 | 5/2017 | Pletenetskyy |
| 2017/0169747 A1 | 6/2017 | Richards et al. |
| 2017/0205277 A1 | 7/2017 | Ohtsuki |
| 2017/0248790 A1 | 8/2017 | Cheng |
| 2017/0307896 A1 | 10/2017 | Kovaluk et al. |
| 2017/0336636 A1 | 11/2017 | Amitai et al. |
| 2017/0353714 A1 | 12/2017 | Poulad et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0046859 A1 | 2/2018 | Jarvenpaa |
| 2018/0067315 A1 | 3/2018 | Amitai et al. |
| 2018/0130391 A1 | 5/2018 | Bohn |
| 2018/0157057 A1 | 6/2018 | Gelberg et al. |
| 2018/0210202 A1 | 7/2018 | Danziger |
| 2018/0267317 A1 | 9/2018 | Amitai |

(56) References Cited

U.S. PATENT DOCUMENTS

| | | |
|---|---|---|
| 2018/0275384 A1 | 9/2018 | Danziger et al. |
| 2018/0275409 A1* | 9/2018 | Gao .................. G02B 27/0093 |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0037712 A1 | 1/2019 | Kim et al. |
| 2019/0037718 A1 | 1/2019 | Shapiro et al. |
| 2019/0041634 A1 | 2/2019 | Popovich et al. |
| 2019/0056600 A1 | 2/2019 | Danziger et al. |
| 2019/0064518 A1 | 2/2019 | Danziger |
| 2019/0068944 A1 | 2/2019 | Zhang et al. |
| 2019/0086674 A1 | 3/2019 | Sinay et al. |
| 2019/0101767 A1 | 4/2019 | Geng et al. |
| 2019/0155035 A1 | 5/2019 | Amitai |
| 2019/0159354 A1 | 5/2019 | Zheng |
| 2019/0170327 A1 | 6/2019 | Eisenfeld et al. |
| 2019/0187482 A1 | 6/2019 | Lanman |
| 2019/0208187 A1 | 7/2019 | Danziger |
| 2019/0212487 A1 | 7/2019 | Danziger et al. |
| 2019/0222830 A1 | 7/2019 | Edwin et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0027855 A1 | 1/2020 | Lee et al. |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0261279 A1 | 8/2020 | Weidman et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0165231 A1 | 6/2021 | Gelberg et al. |
| 2021/0239898 A1 | 8/2021 | Danziger et al. |
| 2022/0018760 A1 | 1/2022 | Spartz et al. |
| 2022/0035758 A1 | 2/2022 | Hanna et al. |
| 2022/0252886 A1 | 8/2022 | Jung et al. |

FOREIGN PATENT DOCUMENTS

| | | |
|---|---|---|
| CN | 106054292 | 10/2016 |
| CN | 207216158 U | 4/2018 |
| CN | 207424391 U | 5/2018 |
| JP | H09101479 A | 4/1997 |
| JP | 2001021448 | 1/2001 |
| JP | 2006145644 A | 6/2006 |
| JP | 2008035146 | 2/2008 |
| JP | 2008134471 | 6/2008 |
| JP | 2013231652 | 11/2013 |
| JP | 2017135605 A | 8/2017 |
| WO | 2007/037089 | 4/2007 |
| WO | 2016203212 | 12/2016 |
| WO | WO/2022/107140 | 5/2022 |

OTHER PUBLICATIONS

Mukawa H "A full-color eyewear display using planar waveguides with reflection volume holograms", Article in Information Display • Mar. 2009 DOI: 10.1002/j.2637-496X.2009.tb00066.x.

Wei Chen et al; "An Image Quality Evaluation Method of Near-eye Display" in 1060 • SID Symposium Digest of Technical Papers, vol. 47, No. 1, May 1, 2016, pp. 1060-1063, XP 0554411041, US.

* cited by examiner

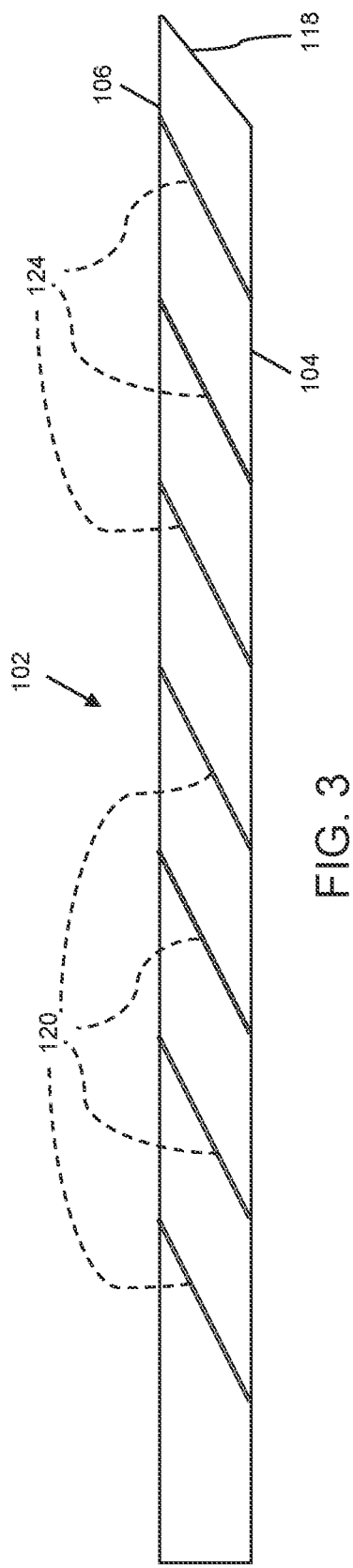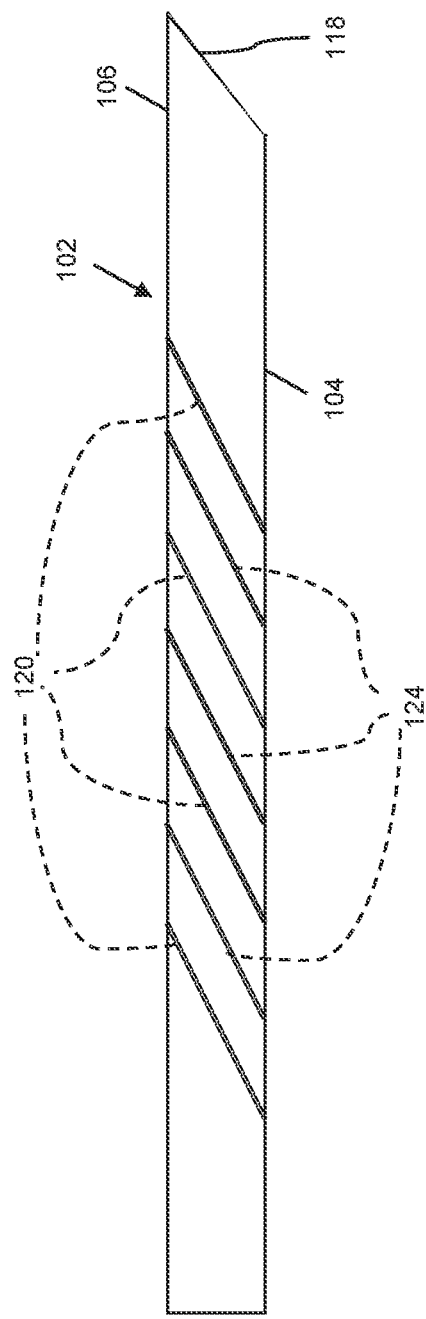

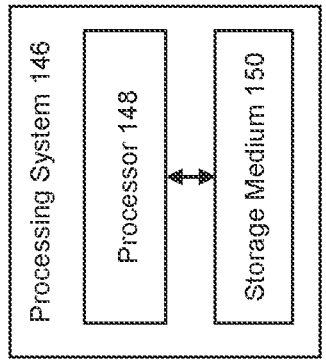
FIG. 11
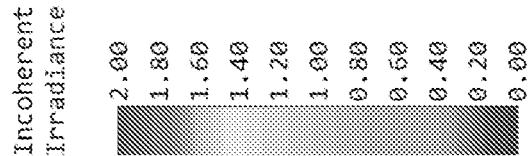
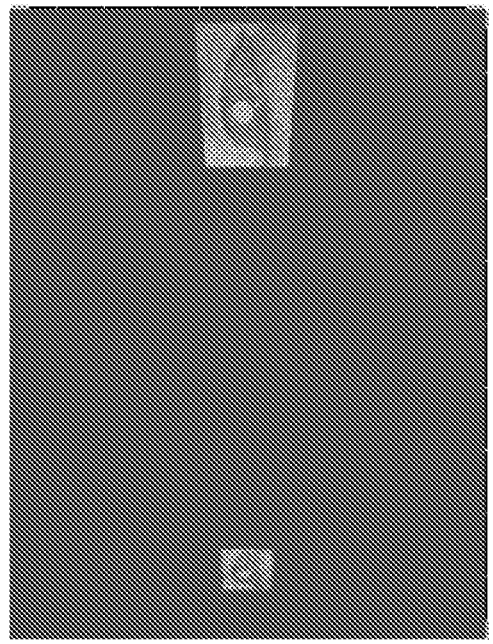
FIG. 10

OPTICAL SYSTEMS AND METHODS FOR EYE TRACKING BASED ON REDIRECTING LIGHT FROM EYE USING AN OPTICAL ARRANGEMENT ASSOCIATED WITH A LIGHT-GUIDE OPTICAL ELEMENT

CROSS-REFERENCE TO RELATED APPLICATIONS

This application claims priority from U.S. Provisional Patent Application No. 62/953,557, filed Dec. 25, 2019, U.S. Provisional Patent Application No. 62/958,755, filed Jan. 9, 2020, and U.S. Provisional Patent Application No. 63/023,891, filed July May 13, 2020, whose disclosures are incorporated by reference in their entireties herein.

TECHNICAL FIELD

The present invention relates to eye tracking.

BACKGROUND OF THE INVENTION

Optical arrangements for near eye display (NED), head mounted display (HMD) and head up display (HUD) require large aperture to cover the area where the observer's eye is located (commonly referred to as the eye motion box—or EMB). In order to implement a compact device, the image that is to be projected into the observer's eye is generated by a small optical image generator (projector) having a small aperture that is multiplied to generate a large aperture.

An approach to aperture multiplication in one dimension has been developed based on a parallel-faced slab of transparent material within which the image propagates by internal reflection. Part of the image wavefront is coupled out of the slab, either by use of obliquely angled partial reflectors or by use of a diffractive optical element on one surface of the slab. Such a slab is referred herein as a light-guide optical element (LOE), light-transmitting substrate, or optical waveguide. The principles of such aperture multiplication are illustrated schematically in FIG. 1, which shows a light-guide optical element 10 having a pair of parallel major external surfaces (faces) 12, 14 for guiding light by internal reflection (preferably but not necessarily total internal reflection). An image projector 16 (represented schematically as a rectangle) generates a projected image 18, as represented here schematically by a beam of illumination 18 including sample rays 18A and 18B which span the beam. The projected image 18 is coupled into the light-guide optical element 10 by an optical coupling-in configuration 20, as illustrated here schematically by a prism 20 (referred to interchangeably as a "wedge"), so as to generate reflected rays 22 which are trapped by internal reflection within the substrate, generating also rays 24. Here, the coupling wedge 20 includes three major surfaces, one of which is located next to (or is common with) a slant edge 26 of the LOE 10 (where the edge 26 is at an oblique angle to the faces 12, 14).

The coupled-in image 18 propagates along the substrate 10 by repeated internal reflection from the faces 12, 14, impinging on an optical coupling-out configuration 28, as illustrated here schematically by a sequence of partially reflective surfaces 28 at an oblique angle ($\alpha_{sur}$) to the parallel faces 12, 14, where part of the image intensity is reflected so as to be coupled out of the substrate as rays 30A and 30B toward the pupil 32 of an eye 34 of an observer that is located in the EMB 36 at a an eye relief (ER) distance 38 from the surface 12. In order to minimize unwanted reflections which might give rise to ghost images, the partially reflective surfaces 28 are preferably coated so as to have low reflectance for a first range of incident angles, while having the desired partial reflectivity for a second range of incident angles, where a ray with a small inclination to the normal to a partially reflective surface 28 (represented here as angle $\beta_{ref}$) is split in order to generate a reflected ray for coupling out, while a high inclination (to the normal) ray is transmitted with negligible reflection.

The projected image 18 is a collimated image, i.e., where each pixel is represented by a beam of parallel rays at a corresponding angle, equivalent to light from a scene far from the observer (the collimated image is referred to as being "collimated to infinity"). The image is represented here simplistically by rays corresponding to a single point in the image, typically a centroid of the image, but in fact includes a range of angles to each side of this central beam, which are coupled in to the substrate with a corresponding range of angles, and similarly coupled out at corresponding angles, thereby creating a field of view corresponding to parts of the image arriving in different directions to the eye 34 of the observer.

An optical function which could be useful for NED, HMD or HUD designs is eye tracking, or sensing the direction the eye of the observer is looking relative to the direction of the head (commonly referred to as the gaze direction). Various solutions for eye-tracking have been proposed. In one set of solutions, the eye is imaged within the EMB via the LOE by coupling light, reflected from the eye, into the LOE such that the reflected light propagates through the LOE by internal reflection back to the image projector (i.e., in a reverse direction relative to the image light from the image projector). These solutions attempt to overcome the fundamental problem that the EMB is not located at infinity like the collimated image from the image projector, but rather at a relatively close distance to the LOE. In another set of solutions, the EMB is imaged using one or more cameras deployed in front of the eye at an off-axis position on peripheral portions of a mechanical body to which the LOE is mounted, such as an eye-glasses frame. However, the proximity between the peripheral portions of the mechanical body and the eye makes imaging the eye within the EMB difficult due to the relatively large keystone angle. Obviously, deploying a camera directly in front of the eye could enable high-quality EMB imaging and image processing, however the positioning of the cameras directly in front of the eye will obscure the viewer's natural view.

SUMMARY OF THE INVENTION

Aspects of the present invention provide an eye tracker and corresponding method for tracking the gaze direction of a human eye based on imaging the eye via a light-guide optical element, and are particularly suitable for integrating as part of a NED, HMD or HUD.

Aspects of the present invention provide an eye tracker and corresponding method for tracking the gaze direction of a human eye based on imaging the eye via a light redirecting optical arrangement, associated with a light-guide optical element, that redirects light reflected from the eye, in response to illumination of the eye, toward an optical sensor as unguided light, and are particularly suitable for integrating as part of a NED, HMD or HUD.

According to the teachings of an embodiment of the present invention, there is provided an optical system. The optical system comprises: a light-transmitting substrate having at least two major surfaces deployed with a first of the major surfaces in facing relation to an eye of a viewer; an optical sensor deployed for sensing light; a light redirecting arrangement associated with the light-transmitting substrate configured to deflect light from the eye toward the optical sensor such that the deflected light that reaches the optical sensor is unguided by the light-transmitting substrate, and the deflecting of light by the light redirecting arrangement occurs at the light-transmitting substrate; and at least one processor electrically coupled to the optical sensor and configured to process signals from the optical sensor to derive a current gaze direction of the eye.

Optionally, the optical system further comprises: an illumination arrangement deployed to illuminate the eye with light such that the eye reflects a proportion of the light from the illumination arrangement as reflected light, and the reflected light corresponds to the light from the eye that is deflected by the light redirecting arrangement.

Optionally, the illumination arrangement includes at least a first source of light and a second source of light, the first source of light is configured to produce light having wavelengths in a given first range of wavelengths, and the second source of light is configured to produce light having wavelengths in a given second range of wavelengths, the given first range of wavelengths and given second range of wavelengths being non-overlapping ranges.

Optionally, the light from the eye that is deflected by the light redirecting arrangement primarily includes light having wavelengths outside of the visible light region of the electromagnetic spectrum.

Optionally, the light from the eye that is deflected by the light redirecting arrangement primarily includes light having wavelengths in the visible light region of the electromagnetic spectrum.

Optionally, the light redirecting arrangement transmits light having wavelengths in the visible light region of the electromagnetic spectrum and reflects light having wavelengths outside of the visible light region of the electromagnetic spectrum.

Optionally, the light redirecting arrangement includes at least one partially reflective surface located within the light-transmitting substrate.

Optionally, the two major surfaces of the light-transmitting substrate are mutually parallel, and the at least one partially reflective surface is a flat surface that is at an oblique angle to the two major surfaces.

Optionally, the light-transmitting substrate is configured to guide light, corresponding to an image collimated to infinity, by internal reflection between the two major surfaces of the light-transmitting substrate, and the optical system further comprises: a second at least one partially reflective surface located within the light-transmitting substrate for coupling the light, guided by internal reflection between the two major surfaces, out of the light-transmitting substrate to the eye of the viewer.

Optionally, the second at least one partially reflective surface is a flat surface at an oblique angle to the two major surfaces.

Optionally, the at least one partially reflective surface and the second at least one partially reflective surface are parallel to each other.

Optionally, the at least one partially reflective surface and the second at least one partially reflective surface are non-parallel to each other.

Optionally, the at least one partially reflective surface is deployed in non-overlapping relation to the second at least one partially reflective surface.

Optionally, the at least one partially reflective surface is deployed in overlapping relation to the second at least one partially reflective surface.

Optionally, the light redirecting arrangement includes a diffractive element associated with at least a portion of one of the major surfaces of the light-transmitting substrate.

Optionally, the light redirecting arrangement includes a selectively reflective surface associated with at least a portion of one of the major surfaces of the light-transmitting substrate.

Optionally, the selectively reflective surface is formed from at least one of a dielectric coating or a dichroic coating applied to the at least the portion of the major surface.

Optionally, the light redirecting arrangement deflects a first set of light rays from the eye through an imaging lens toward the optical sensor so as to form a first image of at least a portion of the eye, and the optical system further comprises: a second light redirecting arrangement configured to deflect a second set of light rays from the eye through the imaging lens toward the optical sensor so as to form a second image of at least a portion of the eye.

Optionally, the at least one processor is further configured to process signals from the optical sensor that correspond to the first and second images so as to determine a distance between the eye and the first of the major surfaces.

Optionally, the light redirecting arrangement includes one of: at least one partially reflective surface located within a first portion of the light-transmitting surface, a diffractive element associated with at least a first portion of one of the major surfaces of the light-transmitting substrate, or a selectively reflective surface associated with at least a first portion of one of the major surfaces of the light-transmitting substrate, and the second light redirecting arrangement includes one of: at least one partially reflective surface located within a second portion of the light-transmitting surface, a diffractive element associated with at least a second portion of one of the major surfaces of the light-transmitting substrate, or a selectively reflective surface associated with at least a second portion of one of the major surfaces of the light-transmitting substrate.

Optionally, at least one of the major surfaces of the light-transmitting substrate is a curved surface.

Optionally, the light-transmitting substrate is configured to guide light, corresponding to an image collimated to infinity, by internal reflection between the two major surfaces of the light-transmitting substrate, and the optical system further comprises: an optical coupling-out configuration for coupling the light, guided by internal reflection between the two major surfaces, out of the light-transmitting substrate.

Optionally, the optical coupling-out configuration includes a diffractive element.

Optionally, the optical coupling-out configuration includes at least one partially reflective surface located within the light-transmitting substrate.

Optionally, the two major surfaces of the light-transmitting substrate are parallel to each other, and the at least one partially reflective surface is a flat surface at an oblique angle to the two major surfaces.

Optionally, the optical coupling-out configuration is deployed in non-overlapping relation to the light redirecting arrangement.

Optionally, the optical coupling-out configuration is deployed in overlapping relation to the light redirecting arrangement.

Optionally, the light-transmitting substrate is configured to guide light in one dimension.

Optionally, the light-transmitting substrate is configured to guide light in two dimensions.

Optionally, the light redirecting arrangement is deployed in a first set of parallel planes, and the optical coupling-out configuration is deployed in a second set of parallel planes.

Optionally, the first and second sets of planes are mutually parallel.

Optionally, the first and second sets of planes are mutually orthogonal.

Optionally, the first and second sets of planes are mutually oblique.

Optionally, the light-transmitting substrate is integrated as part of a near eye display.

Optionally, the light-transmitting substrate is integrated as part of a head up display.

Optionally, the optical sensor is deployed between the eye of the viewer and the first of the major surfaces.

Optionally, the light from the eye that is deflected by the light redirecting arrangement undergoes at most a single reflection within the light-transmitting substrate before reaching the optical sensor.

Optionally, the optical system further comprises: at least one imaging optical element deployed in an optical path from the light redirecting arrangement to the optical sensor for forming at least one image of at least a portion of the eye on the optical sensor.

There is also provided according to an embodiment of the teachings of the present invention an optical system. The optical system comprises: a light-transmitting substrate having two mutually parallel major external surfaces deployed with one of the major external surfaces in facing relation to an eye of a viewer; an optical coupling-in configuration for coupling light corresponding to a collimated image into the light-transmitting substrate, so as to propagate within the light-transmitting substrate by internal reflection between the major external surfaces; an optical coupling-out configuration for coupling light, propagating within the light-transmitting substrate by internal reflection, out of the light-transmitting substrate; an optical sensor deployed for sensing light; a light redirecting arrangement associated with the light-transmitting substrate configured to deflect light from the eye toward the optical sensor such that the deflected light that reaches the optical sensor is unguided by the light-transmitting substrate, and the deflecting of light by the light redirecting arrangement occurs at the light-transmitting substrate; and at least one processor electrically coupled to the optical sensor and configured to process signals from the optical sensor to derive a current gaze direction of the eye.

Optionally, the light redirecting arrangement includes at least one partially reflective surface located within the light-transmitting surface, and the at least one partially reflective surface is a flat surface at an oblique angle to the two major external surfaces.

Optionally, the optical coupling-out configuration includes a second at least one partially reflective surface, and the second at least one partially reflective surface is a flat surface an oblique angle to the two major external surfaces.

Optionally, the at least one partially reflective surface and the second at least one partially reflective surface are mutually parallel.

Optionally, the at least one partially reflective surface is non-parallel to the second at least one partially reflective surface.

Optionally, the optical coupling-out configuration is deployed in non-overlapping relation to the light redirecting arrangement.

Optionally, the optical coupling-out configuration is deployed in overlapping relation to the light redirecting arrangement.

Optionally, the light corresponding to the collimated image primarily includes light having wavelengths in the visible light region of the electromagnetic spectrum, and the light from the eye that is deflected by the light redirecting arrangement primarily includes light having wavelengths outside of the visible light region of the electromagnetic spectrum.

Optionally, the optical system further comprises: at least one imaging optical element deployed in an optical path from the light redirecting arrangement to the optical sensor for forming at least one image of at least a portion of the eye on the optical sensor.

There is also provided according to an embodiment of the teachings of the present invention an optical system. The optical system comprises: a light-transmitting substrate having two mutually parallel major external surfaces deployed with one of the major external surfaces in facing relation to an eye of a viewer; an optical coupling-in configuration for coupling light corresponding to a collimated image into the light-transmitting substrate, so as to propagate within the light-transmitting substrate by internal reflection between the major external surfaces; at least one first partially reflective surface located within the light-transmitting substrate for coupling light, propagating within the light-transmitting substrate by internal reflection, out of the light-transmitting substrate, the at least one first partially reflective surface is a flat surface that is non-parallel to the two major external surfaces and is at an oblique angle to the two major external surfaces; an optical sensor deployed for sensing light; a light redirecting arrangement including a second at least one partially reflective surface located within the light-transmitting substrate configured to deflect light from the eye toward the optical sensor such that the deflected light that reaches the optical sensor is unguided by the light-transmitting substrate, and the deflecting of light rays by the light redirecting arrangement occurs at the light-transmitting substrate; and at least one processor electrically coupled to the optical sensor and configured to process signals from the optical sensor to derive a current gaze direction of the eye.

Optionally, the at least one second partially reflective surface transmits light having wavelengths in the visible light region of the electromagnetic spectrum and reflects light having wavelengths outside of the visible light region of the electromagnetic spectrum.

Optionally, the light corresponding to the collimated image primarily includes light having wavelengths in the visible light region of the electromagnetic spectrum, and the light from the eye that is deflected by the light redirecting arrangement primarily includes light having wavelengths outside of the visible light region of the electromagnetic spectrum Optionally, the at least one first partially reflective surface and the at least one second partially reflective surface are mutually parallel.

Optionally, the at least one first partially reflective surface is non-parallel to the at least one second partially reflective surface.

Optionally, the at least one first partially reflective surface is deployed in non-overlapping relation to the at least one second partially reflective surface.

Optionally, the at least one first partially reflective surface is deployed in overlapping relation to the at least one second partially reflective surface.

Optionally, the optical system further comprises: at least one imaging optical element deployed in an optical path from the light redirecting arrangement to the optical sensor for forming at least one image of at least a portion of the eye on the optical sensor.

There is also provided according to an embodiment of the teachings of the present invention an optical system. The optical system comprises: an optical sensor deployed for sensing light; a light redirecting arrangement associated with a light-transmitting substrate having at least two major surfaces deployed with a first of the major surfaces in facing relation to an eye of a viewer, the light redirecting arrangement configured to deflect light from the eye toward the optical sensor such that the deflected light that reaches the optical sensor is unguided by the light-transmitting substrate, and the deflecting of light by the light redirecting arrangement occurs at the light-transmitting substrate; and at least one processor electrically coupled to the optical sensor and configured to process signals from the optical sensor to derive a current gaze direction of the eye.

There is also provided according to an embodiment of the teachings of the present invention an optical system. The optical system comprises: a light-transmitting substrate having at least two major surfaces deployed with a first of the major surfaces in facing relation to an eye of a viewer, the location of the eye relative to the light-transmitting substrate defining an eye motion box; an illumination arrangement deployed to illuminate the eye motion box with eye-tracking light such that a proportion of intensity of the eye-tracking light is reflected by the eye as reflected light; an optical sensor deployed for sensing light; a light redirecting arrangement associated with the light-transmitting substrate configured to deflect the reflected light toward the optical sensor, the deflected light that reaches the optical sensor is unguided by the light-transmitting substrate, and the deflecting of light by the light redirecting arrangement occurs at the light-transmitting substrate; and at least one processor electrically coupled to the optical sensor and configured to process signals from the optical sensor to derive a current gaze direction of the eye.

There is also provided according to an embodiment of the teachings of the present invention an optical system. The optical system comprises: an illumination arrangement deployed to illuminate an eye motion box with eye-tracking light, the eye motion box defining a location of an eye of a viewer relative to a light-transmitting substrate having at least two major surfaces deployed with a first of the major surfaces in facing relation to the eye, a proportion of intensity of the eye-tracking light being reflected by the eye as reflected light; an optical sensor deployed for sensing light; a light redirecting arrangement associated with the light-transmitting substrate and configured to deflect the reflected light toward the optical sensor, the deflected light that reaches the optical sensor is unguided by the light-transmitting substrate, and the deflecting of light by the light redirecting arrangement occurs at the light-transmitting substrate; and at least one processor electrically coupled to the optical sensor and configured to process signals from the optical sensor to derive a current gaze direction of the eye.

Within the context of this document, the term "guided" generally refers to light that is trapped within a light-transmitting material (e.g., a substrate) by internal reflection at major external surfaces of the light-transmitting material, such that the light that is trapped within the light-transmitting material propagates in a propagation direction through the light-transmitting material. Light propagating within the light-transmitting substrate is trapped by internal reflection when the propagating light is incident to major external surfaces of the light-transmitting material at angles of incidence that are within a given angular range. The internal reflection of the trapped light may be in the form of total internal reflection, whereby propagating light that is incident to major external surfaces of the light-transmitting material at angles greater than a critical angle (defined in part by the refractive index of the light-transmitting material and the refractive index of the medium in which the light-transmitting is deployed, e.g., air) undergoes internal reflection at the major external surfaces. Alternatively, the internal reflection of the trapped light may be effectuated by a coating, such as an angularly selective reflective coating, applied to the major external surfaces of the light-transmitting material to achieve reflection of light that is incident to the major external surfaces within the given angular range. Light that is guided through a light-transmitting material undergoes at least two reflections from the major external surfaces of the light-transmitting material.

The term "unguided", as used within the context of the present disclosure, generally refers to light that is not guided. Light that is unguided traverses a light-transmitting material (e.g., a substrate) without being trapped within the light-transmitting material, i.e., without being trapped between external major surfaces of the light-transmitting material by internal reflection. The light redirecting arrangements of the present disclosure deflect light from the EMB/viewer's eye to an imaging/detection subsystem, and in particular to an optical sensor, such that the light is deflected at the light-transmitting material without being trapped within the light-transmitting material so as to propagate to the optical sensor under free-space propagation. In other words, the light from the EMB/viewer s eye is deflected by the light redirecting arrangements such that the light that reaches the optical sensor is unguided by the light-transmitting material.

The eye tracker according to the various embodiments of the present invention relies on deflection, by a light redirecting arrangement, of light reflected from the toward an optical sensor. The light that is reflected from the eye is also referred to herein as eye-tracking light, and is referred to herein as being within the "eye-tracking spectrum". The eye tracker according to the various embodiments of the present invention is particularly effective when the eye-tracking light is in the near infrared (NIR) region of the electromagnetic spectrum (i.e., when the eye-tracking spectrum is within the NIR region). However, the eye tracker may also be effective when the eye-tracking light is in the visible region of the electromagnetic spectrum (i.e., when the eye-tracking spectrum is within the visible light region). In addition, and as will be discussed in greater detail, embodiments of the present invention are also contemplated in which the eye-tracking spectrum is outside of both the visible light and NIR regions.

Within the context of this document, light in the NIR region of the electromagnetic spectrum generally refers to light having wavelengths in the range of 700-1400 nanometers (nm), and in certain instances 680-1400 nm. The wavelengths in the vicinity of 700 nm, i.e., in the range of 680-750 nm, may encroach on darker red visible light, but may be of particular advantage when used to illuminate the eye for eye tracking purposes. In the context of the present document, light that is described as primarily having wavelengths in the NIR region generally refers to light having wavelengths in the range of 700-1400 nm or 680-1400 nm unless explicitly stated otherwise unless explicitly stated otherwise. In the context of this document, light that is described as having wavelengths outside of the NIR region generally refers to light having wavelengths less than 700 nm (or less than 680 nm) or greater than 1400 nm unless explicitly stated otherwise.

Within the context of this document, light in the visible region of the electromagnetic spectrum, generally refers to light having wavelength in the range of 380-750 nm. Accordingly, there may be some overlap between the NIR region and the visible light region. In the context of this document, light that is described as primarily having wavelengths in the visible light region generally refers to light having wavelengths in the range of 380-700 nm or 380-680 nm unless explicitly stated otherwise. In the context of this document, light that is described as primarily having wavelengths outside of the visible light region generally refers to light having wavelengths less than 380 nm or greater than 700 nm (or greater than 680 nm) unless explicitly stated otherwise. The visible region is referred to interchangeably herein as the "visible light region", "photopic region", and "photopic spectrum".

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 3 is a schematic side view an alternative deployment configuration of the light redirecting arrangement FIG. 2;

FIG. 4 is a schematic side view of yet another alternative deployment configuration of the light redirecting arrangement of FIG. 2, in which the partially reflective surfaces are in overlapping relation with an optical coupling-out configuration, implemented as another set of partially reflective surfaces, that couples an image out of the light-guide optical element to the eye;

FIG. 10 is a representation of two independent images captured by a single optical sensor using two light redirecting arrangements;

FIG. 11 is a block diagram of a processing subsystem configured to process signals from the optical sensor to derive a current gaze direction of the eye.

DESCRIPTION OF THE PREFERRED EMBODIMENTS

Figure 1:
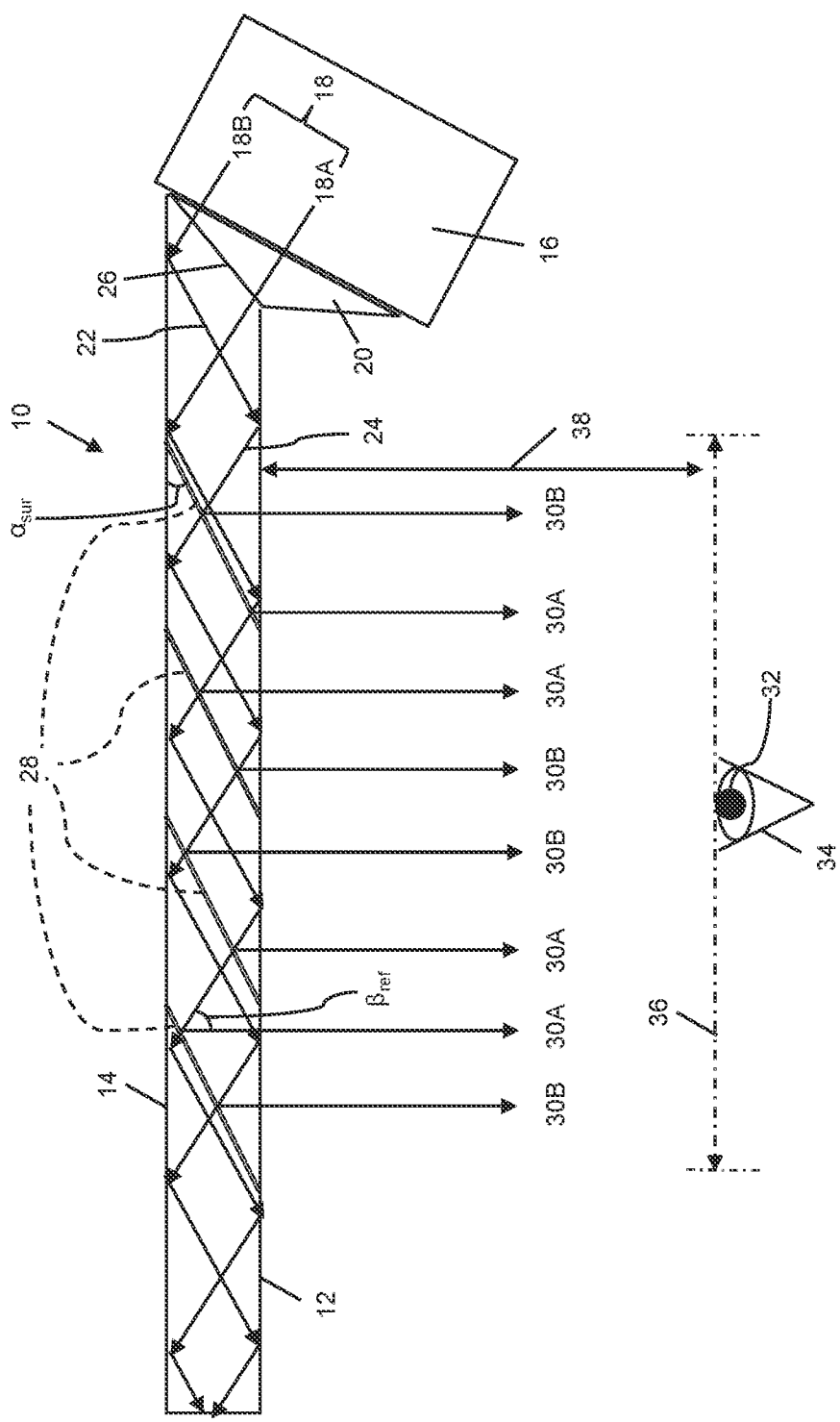
FIG. 1 is a schematic side view, described above, of a prior art light-guide optical element employing partially-reflective surfaces, for use in a near-eye display.

Embodiments of the present invention provide various apparatus and corresponding methods for tracking the gaze direction of a human eye based on imaging the eye via an optical arrangement associated with a light-guide optical element.

The principles and operation of the various eye tracking apparatus according to present invention may be better understood with reference to the drawings accompanying the description.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Figure 2:
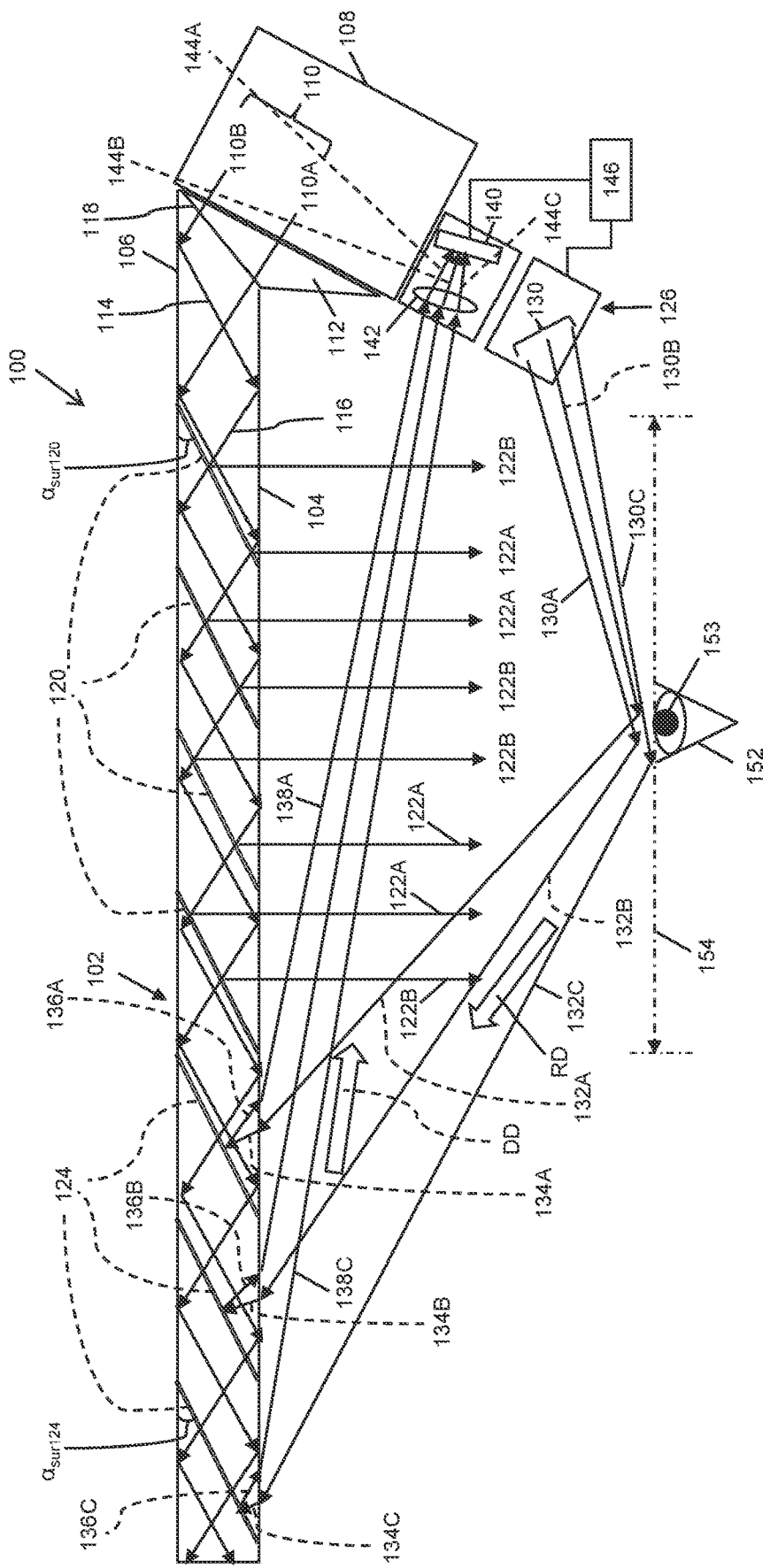
FIG. 2 is a schematic side view of an optical system, constructed and operative according to an embodiment of the present invention, for displaying an image via a light-guide optical element, and that includes an apparatus for tracking the gaze direction of a human eye using a light redirecting arrangement, implemented as a set of partially reflective surfaces associated with the light-guide optical element, that deflects light toward an optical sensor.

Referring now to the drawings, FIG. 2 illustrates various aspects of the structure and operation of an optical system, generally designated 100, constructed and operative according to a non-limiting embodiment of the present invention, for deriving a gaze direction of a human eye 152. Generally speaking, the optical system 100 includes a substrate 102 formed from transparent material (such as glass) and having a pair of faces (major surfaces) 104, 106 deployed with one of surfaces 104 in facing relation to an eye 152 of a viewer, and an apparatus associated with the substrate 102 for deriving a gaze direction of the eye 152. The apparatus includes an optical sensor 140 for sensing light, a light redirecting optical arrangement (referred to hereinafter as a "light redirecting arrangement") 124 associated with the substrate 102 for deflecting light that is reflected from the eye 152 toward the optical sensor 140, and a processing subsystem 146 that processes signals from the optical sensor 140 to derive a current gaze direction of the eye 152.

The light that is reflected from the eye 152 propagates toward the light redirecting arrangement 124 in a general reflection direction (represented schematically in the drawings by the thick arrow labeled "RD"), and the light that is deflected by the light redirecting arrangement 124 propagates towards the optical sensor 140 in a general deflection direction (represented schematically in the drawings by the thick arrow labeled "DD").

The illustrated embodiment is particularly suitable for augmented reality (AR) and virtual reality (VR) applications, in which a projected image is coupled into the substrate 102, guided through the substrate 102 by internal reflection, and coupled out of the substrate for viewing by the eye 152. It is noted, however, that embodiments of the present invention may also be suitable in non-AR/VR applications, in which the substrate is not configured to guide light by internal reflection. Such embodiments will be discussed in subsequent sections of the present disclosure.

In the non-limiting embodiment illustrated in FIG. 2, the substrate 102 is a light-transmitting substrate (i.e., a lightguide optical element or "LOE") that has planar and mutually parallel faces (surfaces) 104, 106 and that is configured for guiding light by internal reflection, similar to as described with reference to FIG. 1. In certain embodiments, the propagation by internal reflection is in the form of total internal reflection (i.e., the internal reflection is governed by critical angle, as discussed above), whereas in other embodiments the propagation by internal reflection is effectuated by a coating (e.g., an angularly selectively reflective coating) applied to the surfaces 104, 106.

In the illustrated embodiment, the LOE 102 is part of the apparatus for deriving the gaze direction, and the apparatus is further configured for displaying an image to the eye 152 (when located within EMB 154). Here, the optical system 100 further includes an image projection arrangement (referred to hereinafter as an "image projector") 108 that generates a projected image 110, as represented here schematically by a beam of illumination 110 (in the visible light region of the electromagnetic spectrum) including sample rays 110A and 110B which span the beam. Although not shown in the drawings, the image projector 108 includes a microdisplay, such as a liquid-crystal on silicon (LCoS), organic light-emitting diode (OLED), and the like, for generating image light, and corresponding collimating optics for collimating the image to infinity. When the microdisplay is implemented a reflective or transmissive display, illumination components (such as one or more LEDs) and illumination optics (such as beamsplitters) are also included in the image projector 108 so as to direct light from the illumination components to the microdisplay, and to direct the image light to the collimating optics.

The image light 110 is coupled into the LOE 102 by an optical coupling-in configuration 112, shown here schematically as a wedge deployed at or near a slant edge 118 of the LOE 102, so as to generate reflected rays 114 (down-going rays) which are trapped by internal reflection within the substrate 102, generating also rays 116 (up-going rays). It is noted, however, that other optical coupling-in configurations are possible, including, for example, a reflecting surface deployed oblique to the surfaces 104, 106.

The coupled-in image 110 propagates along the substrate 102 by repeated internal reflection from the surfaces 104, 106 (i.e., is guided by the substrate 102), impinging on an optical coupling-out configuration 120, as illustrated here schematically by a sequence of mutually parallel partially reflective surfaces 120 deployed within the substrate 102 at an oblique angle to the parallel faces 104, 106, where part of the image intensity is reflected by the optical coupling-out configuration 120 so as to be coupled out of the substrate 102 toward the eye 152. The coupled-out image light is represented schematically as rays 122A and 122B. The set of partially reflective surfaces 102 is merely illustrative of one non-limiting implementation of an optical coupling-out configuration, and other optical coupling configurations can be used to couple image light out of the LOE 102. The optical coupling-out configuration may be any optical coupling arrangement which deflects part of the image incident light already propagating within the LOE 102 by internal reflection to an angle such that the deflected part of the image incident light exits the LOE 102. Other examples of such suitable optical coupling arrangements include, but are not limited to, one or more diffractive optical elements deployed on either of the faces 104, 106, and a beamsplitter arrangement.

An illumination arrangement 126 is deployed for illuminating the EMB 154 with light (referred to as "eye-tracking light") 130, such that when the eye 152 is positioned within the EMB 154 the eye 152 is illuminated with the eye-tracking light 130. In certain preferred but non-limiting implementations, the illumination arrangement 126 is configured to illuminate the EMB 154 with light having wavelengths outside of the photopic region of the electromagnetic spectrum. In other words, the illumination arrangement 126 is preferably configured to illuminate the eye 152 with light that is not visible to the human eye so as not to interfere with human vision. In particularly preferred but non-limiting implementations, the illumination arrangement 126 is configured to illuminate the eye 152 with light having wavelengths in the near infrared (NIR) region of the electromagnetic spectrum, preferably wavelengths in the range of 700-1000 nanometers (nm) and in certain instances in the range of 680-1000 nm. However, other non-limiting implementations are considered in which the illumination arrangement 126 is configured to illuminate the eye 152 with light having wavelengths in the photopic spectrum (i.e., the visible light region of the electromagnetic spectrum) or regions of the electromagnetic spectrum outside of the visible, IR, and NIR regions.

The illumination arrangement 126 includes at least one light source, and preferably includes multiple light sources, each configured for illuminating the EMB 154 with eye-tracking light. The light source (or sources) of the illumination arrangement 126 can be implemented as an LED(s), or any other source that is configured to emit (produce) light in the eye-tracking spectrum. In certain non-limiting implementations, the light sources of the illumination arrangement 126 are isotropic (or near-isotropic) sources that emit light in all directions. The illumination, by the illumination arrangement 126, of the EMB 154 with eye-tracking light 130 is represented schematically in FIG. 2 by the sample light rays 130A, 130B, 130C. It should be appreciated that these light rays 130A, 130B, 130C are merely representative of the eye-tracking light 130 that reaches the EMB 154 (and the eye 152), and that other light rays from other illumination directions may also reach the EMB 154.

A proportion of the intensity of the eye-tracking light 130 that illuminates the eye 152 is reflected by the eye 152 as reflected light in a general reflection direction toward the light redirecting arrangement 124. A proportion of the intensity of the reflected light, represented schematically as reflected light rays 132A, 132B, 132C, reaches the light redirecting arrangement 124 that is associated with the substrate 102, and is deflected by the light redirecting arrangement 124 as deflected light, represented schematically as reflected light rays 138A, 138B, 138C, so as to redirect the reflected light in a general deflection direction toward the optical sensor 140. The deflection of the eye-tracking light by the light redirecting arrangement 124 occurs at the substrate 102, meaning that the point of deflection of the eye-tracking light is within the substrate 102.

Parenthetically, for the purpose of simplicity of presentation, reference is made herein in the text and accompanying drawings to a sole "reflection direction" and to a sole "deflection direction", which correspond to light waves emanating from the eye as they propagate toward the optical sensor via deflection by the light redirecting arrangement. These "directions" are used to represent the general propagation direction of the aforementioned light waves, and are not, strictly speaking, vector directions, but are rather indicative of the general path through free-space that the light waves travel from one point to another. Each of the individual reflected light rays (e.g., rays 132A, 132B, 132C) has its own vector propagation direction, which together span the general reflection direction discussed above. Likewise, each of the individual deflected light rays (e.g., rays 138A, 138B, 138C) has its own vector propagation direction, which together span the general deflection direction discussed above.

In the non-limiting embodiment illustrated in FIG. 2, the light redirecting arrangement 124 is implemented as a sequence (set) of partially reflective surfaces 124 deployed within the substrate 102 at an oblique angle to the parallel faces 104, 106. The partially reflective surfaces 124 are preferably, but not necessarily, mutually parallel. In addition, the partially reflective surfaces 124 planar (i.e., flat) surfaces. Although three partially reflective surfaces 124 are illustrated herein, the light redirecting arrangement 124 may include fewer than three such surfaces or more than three such surfaces. In general, the light redirecting arrangement 124 includes at least one partially reflective surface.

The implementation of the light redirecting arrangement as a set of partially reflective surfaces 124 is merely one illustrative example of a light redirecting arrangement. Other example implementations of a light redirecting arrangement, including implementations based on diffractive and dielectric and/or dichroic coating technologies will be described in detail in subsequent sections of the present disclosure.

The partially reflective surfaces 124 are configured to reflect light having wavelengths in the eye-tracking spectrum (i.e., to reflect light the light reflected by the eye 152 in response to illumination by the illumination arrangement 126). In certain non-limiting implementations, the partially reflective surfaces 124 are further configured to transmit light having wavelengths in the photopic region (e.g., to transmit visible light).

In certain non-limiting implementations, the light redirecting arrangement 124 is deployed such that the eye-tracking light that reaches the light redirecting arrangement 124 is deflected by the light redirecting arrangement 124 at a slant angle relative to the incoming angle, meaning that the angle of the incoming light (rays 132A, 132B, 132C) to the light redirecting arrangement 124 measured relative to the surface 104 is different than the angle of deflected light (rays 138A, 138B, 138C). In certain instances, the angle of the incoming light measured relative to the surface 106 is steeper than the angle of the deflected light (for example, as shown in FIG. 2), for example due in part to the deployment angle ($\alpha_{sur124}$) of the partially reflective surfaces 124.

In the non-limiting example configuration illustrated in FIG. 2, the incoming light to the light redirecting arrangement 124, and the light that is reflected by the light redirecting arrangement 124, is refracted by the surface 106. In particular, the light reflected from the eye 152 (e.g., light rays 132A, 132B, 132C) that is incident on the major surface 104 of the LOE 102 is refracted by the surface 104 (shown schematically as refracted light rays 134A, 134B, 134C). The refracted light 134A, 134B, 134C is deflected by the light redirecting arrangement 124, i.e., reflected by the partially reflective surfaces 124 (shown schematically as reflected light rays 136A, 136B, 136C) so as to impinge again on the major surface 104 of the LOE 102. The incident light 136A, 136B, 136C is refracted again by the surface 104 (shown schematically as refracted light rays 138A, 138B, 138C), and propagates (in free-space) toward the optical sensor 140.

As should be apparent, the reflected light from the eye 152 may strike different portions of the partially reflective surfaces 124, and not just the positions illustrated in FIG. 2. It should be clear that additional rays, beyond the illustrated rays 132A, 132B, 132C, may be incident to the surface 104 so as to generate refracted rays that impinge on portions or regions of the partially reflective surfaces 124 that cover substantially the entirety of each partially reflective surface 124.

It is emphasized that in contrast to the image light 110 from the image projector 108 which is guided by the substrate 102, the light that is deflected by the light redirecting arrangement 124 is unguided by the substrate 102. In particular, and as defined above, the light that is deflected by the light redirecting arrangement 124 reaches the optical sensor 140 without being trapped by internal reflection within the substrate 102 (i.e., free-space propagation). When implemented as a set of partially reflective surfaces 124, the partially reflective surfaces 124 are deployed at an oblique angle ($\alpha_{sur124}$) relative to the major surfaces 104, 106 such that the eye tracking light (rays 134A, 134B, 134C) that is incident to the partially reflective surfaces 124 is reflected by the partially reflective surfaces 124 so as to not be trapped by internal reflection, but rather so as to propagate under free-space propagation toward the optical sensor 140. In the illustrated embodiment, the reflected light from the eye 152 undergoes at most a single reflection within the substrate 102 (the single reflection being the reflection by the partially reflective surfaces 124) prior to reaching the optical sensor 140.

Focusing optics 142, represented schematically as a lens (but which may include a set of lenses), is deployed in an optical path between the light redirecting arrangement and the optical sensor 140. The focusing optics 142 receives the light 138A, 138B, 138C that is deflected by the light redirecting arrangement 124 and converts the received light 138A, 138B, 138C into converging beams of light (represented schematically as light rays 144A, 144B, 144C) that impinge on the optical sensor 140. In certain preferred implementations, the focusing optics 142 is an imaging optic which forms an image of the eye 152 on the optical sensor 140. The focusing optics 142 is preferably deployed to define a field of view corresponding to the region or portion associated with the substrate 102 from which the deflected eye-tracking light will arrive so as to enable the capture of the deflected eye-tracking light by the focusing optics 142. The region or portion associated with substrate 102 is generally the region or portion at which the light redirecting arrangement is deployed. The focusing optics 142 is preferably integrated with the optical sensor 140 as part of a camera system, deployed between the eye 152 and the surface 104, for imaging the eye 152 by capturing the light 138A, 138B, 138C deflected by the light redirecting arrangement 124.

The processing subsystem 146 is electrically associated with the optical sensor 140, and is configured to process signals from the optical sensor 140 to derive a current gaze direction of the eye 152. The processing subsystem 146 is preferably also electrically associated with the illumination arrangement 126 so as to control illumination timing of the EMB by the illumination arrangement 126. The processing system 146 may be implemented using any suitable type of processing hardware and/or software, as is known in the art, including but not limited to any combination of various dedicated computerized processors operating under any suitable operating system and implementing suitable software or firmware modules. The processing system 146 may further include various communications components for allowing wired or wireless communication with LAN and/or WAN devices for bidirectional transfer of information and graphic content. A simplified block diagram of the processing subsystem 146 according to a non-limiting example implementation is illustrated in FIG. 11. Here, the processing subsystem 146 includes at least one computerized processor 148 coupled to a storage medium 150. The storage medium 150 can be one or more computerized memory devices, such as volatile data storage. The processor 148 may be implemented as any number of computerized processors including, but not limited to, microprocessors, microcontrollers, graphics processors, display drivers, application-specific integrated circuits (ASICs), digital signal processors (DSPs), image processors, field-programmable gate arrays (FPGAs), field-programmable logic arrays (FPLAs), and the like. Such computerized processors include, or may be in electronic communication with computer readable media, which stores program code or instruction sets that, when executed by the computerized processor, cause the computerized processor to perform actions. Types of computer readable media include, but are not limited to, electronic, optical, magnetic, or other storage or transmission devices capable of providing a computerized processor with computer readable instructions.

The following paragraphs describe various deployment options of the light redirecting arrangement 124 according to non-limiting embodiments of the present invention. In the non-limiting implementation in which the light redirecting arrangement 124 is implemented as a set of partially reflective surfaces 124, deployment angles ($\alpha_{sur124}$) of the partially reflective surfaces 124 in the range of 10-35 degrees have been found to be particularly suitable for deflecting light from the EMB 154 (eye 152) to the optical sensor 140 in an unguided fashion. In particular, such deployment angles are suitable for deflecting incoming light (rays 132A, 132B, 132C) that is incident to the major surface 104 at angles of incidence (AOI) in the range of 18-40 degrees to deflection angles in the range of 60-90 degrees (where the deflection angles are measured between the rays 138A, 138B, 138C and the normal to the major surface 104). The angular range of 18-40 degrees corresponds to the angular distribution of the eye-tracking light that is reflected from the eye toward the light redirecting arrangement 124.

As previously mentioned, each of the partially reflective surfaces preferably (but not necessarily) has the same deployment angle ($\alpha_{sur124}$) In addition, the deployment angle ($\alpha_{sur124}$) of the partially reflective surfaces 124 may be the same or different from the deployment angle ($\alpha_{sur120}$) of the partially reflective surfaces 120. Generally speaking, a tradeoff between manufacturing complexity of the optical system 100 (and in particular the substrate 102 with sets of embedded partial reflecting surfaces 120 and 124) and the position of the optical sensor 140 (i.e., camera) may be considered when deciding on the deployment angle of the partially reflective surfaces 124. For example, deploying the partially reflective surfaces 120, 124 at a common oblique angle to the major surfaces 104, 106 (i.e., such that the surfaces 120, 124 are mutually parallel) may provide certain advantages during manufacturing of the substrate 102 by reducing the number of manufacturing steps. Typically, the substrate 102 with embedded partial reflecting surfaces is manufactured by deploying transparent plates coated with partially reflective coatings in a stack and then slicing the stack at an oblique angle (as described, for example, in U.S. Pat. No. 8,432,614) to form a slab (substrate) with embedded obliquely angled partial reflectors. The manufacturing process of the substrate 102 of the present invention is simplified when the partially reflective surfaces 120, 124 are to be deployed at a common oblique angle since the stacking and slicing of the coated plates can be performed similar to as described in U.S. Pat. No. 8,432,614.

If, however, the partially reflective surfaces 120, 124 are to be deployed at different oblique angles (i.e., such that the partially reflective surfaces 124 and 120 are non-parallel to each other), the complexity of the manufacturing process may increase by requiring additional steps. Here, the manufacturing process could generally include steps such as: producing a first portion of the substrate having the mutually parallel partially reflective surfaces 120 at a first oblique angle, producing a second portion of the substrate having the mutually parallel partially reflective surfaces 124 at a second oblique angle, and attaching (e.g., via optical cement) the two substrate portions together to form a unitary substrate having the two sets of the partially reflective surfaces at two different deployment angles. The two different deployment angles, while having manufacturing drawbacks, could provide certain advantages in the arrangement of the components of the optical system 100. In particular, different deployment angles provides flexibility in the placement (i.e., spatial positioning) of the optical sensor 140 relative to the substrate 102. For example, the ability to deploy the partially reflective surfaces 124 at angles that are steeper or shallower than the deployment angle of the partially reflective surfaces 120 may allow the optical sensor 140 to be positioned further outside of the viewer's peripheral field of vision than would be otherwise be achievable when using a common deployment angle for the partially reflective surfaces 120, 124.

In addition to having the same or different deployment angles, the partially reflective surfaces 124 and the partially reflective surfaces 120 may be deployed at the same or different planar orientations. Preferably, the partially reflective surfaces 124 are mutually parallel planar surfaces that lay in a first set of mutually parallel planes. Likewise, the partially reflective surfaces 124 are mutually parallel planar surfaces that lay in a second set of mutually parallel planes. In one non-limiting deployment configuration, the first and second sets of planes are parallel (i.e., all of the reflective surfaces 124 and 120 are parallel to each other), for example, as illustrated in FIG. 2. In another non-limiting deployment configuration, the first and second sets of planes are orthogonally oriented to each other (i.e., the plane of each of the partially reflective surfaces 124 is orthogonal to the plane of each of the partially reflective surfaces 120). In yet another non-limiting deployment configuration, the first and second sets of planes are neither parallel nor orthogonal to each other (i.e., they are obliquely oriented, i.e., the plane of each of the partially reflective surfaces 124 is oblique to the plane of each of the partially reflective surfaces 120). As in the deployment angle discussion above, there may be tradeoffs between manufacturing complexity and component layout flexibility when considering the planar orientations of the partially reflective surfaces 120, 124. Using parallel planes may offer the simplest manufacturing process for constructing the substrate 102 with embedded partially reflective surfaces 120, 124. However, orthogonal or oblique sets of planes may offer flexibility as to the placement of the optical sensor 140.

The partially reflective surfaces 124 preferably have dimensions, and are preferably deployed at an angle and orientation, such that both horizontal and vertical eye movement across a desired vertical and horizontal field is captured. It is noted that human gaze direction is wider across the horizontal field than the vertical field. Therefore, in certain preferred embodiments the partially reflective surfaces 124 are dimensioned and deployed at an orientation (plane and deployment angle) so as deflect a wider angular range of light coming from the horizontal field than from the vertical field.

In the non-limiting embodiment illustrated in FIG. 2, the light redirecting arrangement 124 is deployed at or near the distal end of the substrate 102 (where the proximal end of the substrate 102 is the end at which the optical coupling-in configuration 112 and the image projector 108 are located), and the optical coupling-out configuration 120 is deployed along the central portion of the substrate 102 between the proximal and distal ends of the substrate 102. However, the configuration illustrated in FIG. 2 is just one example deployment configuration. Other deployment configurations of the light redirecting arrangement 124 are contemplated herein. For example, FIG. 3 illustrates another non-limiting deployment configuration in which the light redirecting arrangement 124 is deployed at or near the proximal end of the substrate 102, and the optical coupling-out configuration 120 is deployed along the central portion of the substrate 102 between the proximal and distal ends of the substrate 102.

In the non-limiting deployment configurations described above with reference to FIGS. 2 and 3, the light redirecting arrangement 124 and the optical coupling-out configuration 120 are segregated to respective regions of the substrate 102 such that the light redirecting arrangement 124 are in non-overlapping relation to the optical coupling-out configuration 120. In other words, the partially reflective surfaces 124 do not overlap with any of the partially reflective surfaces 120. However, in other non-limiting example deployment configurations, the light redirecting arrangement 124 is deployed so as to at least partially overlap with the optical coupling-out configuration 120. An example of such a configuration is illustrated in FIG. 4, in which the partially reflective surfaces 124 are interleaved with the partially reflective surfaces 120.

Figure 5:
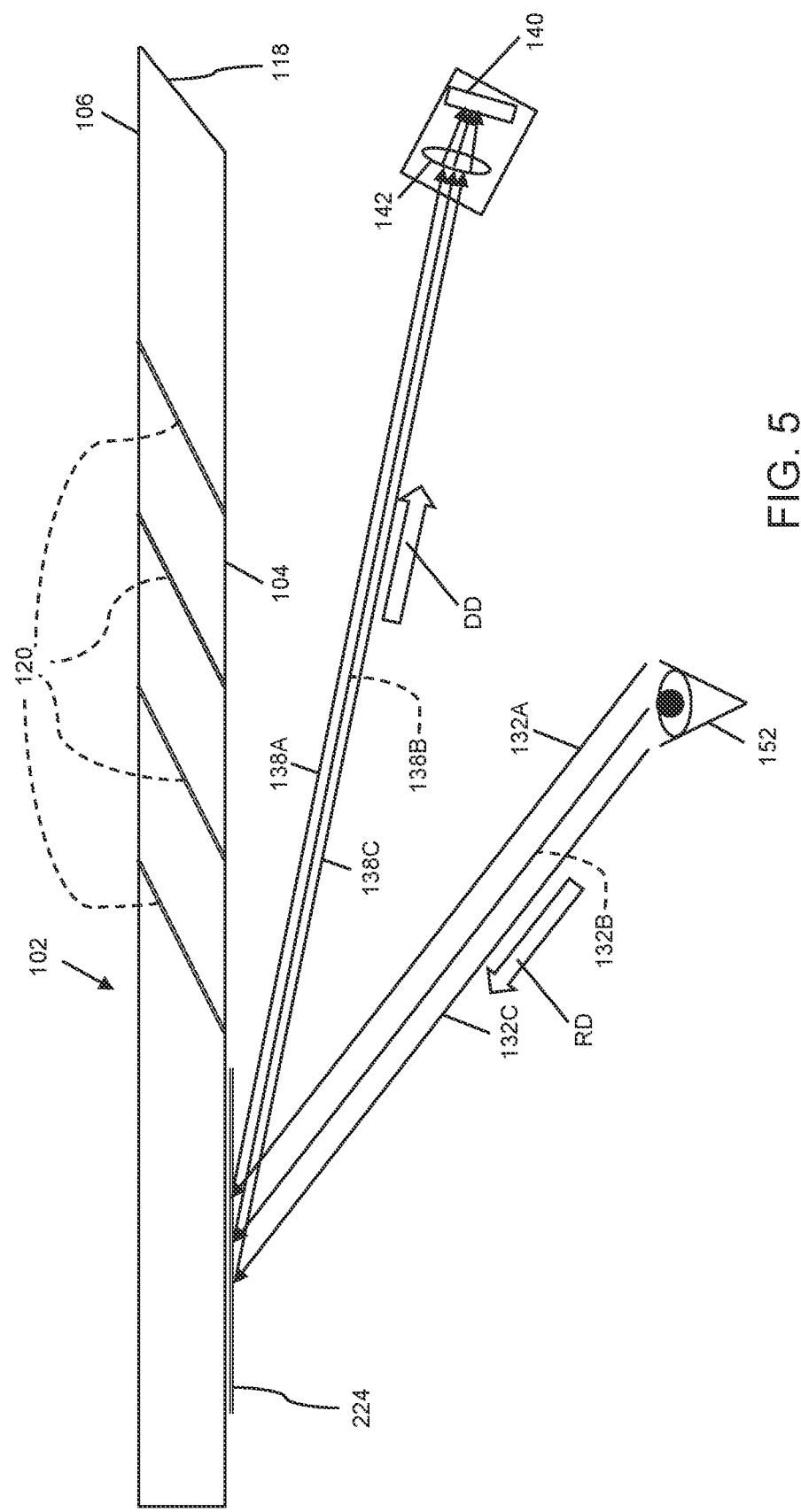
FIG. 5 is a schematic side view of an optical system, constructed and operative according to another embodiment of the present invention, for displaying an image via a light-guide optical element, and that includes an apparatus for tracking the gaze direction of a human eye using a light redirecting arrangement, implemented as a diffractive optical element associated with a portion of one of the major surfaces of the light-guide optical element, that deflects light toward an optical sensor.
Figure 6:
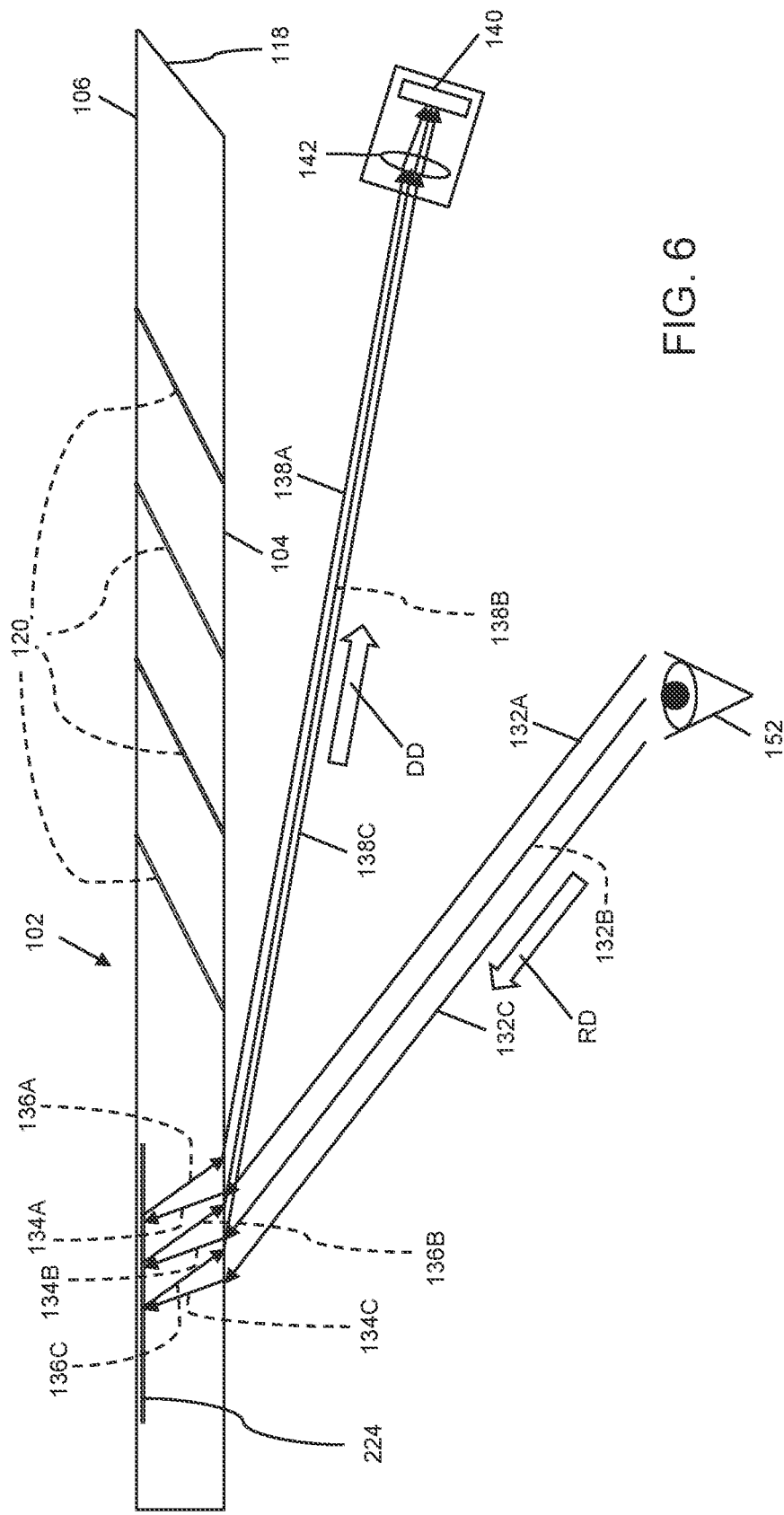
FIG. 6 is a schematic side view of an alternative deployment configuration of the light redirecting arrangement of FIG. 5, in which the diffractive optical element is associated with a portion of another one of the major surfaces of the light-guide optical element.

Referring now to FIGS. 5 and 6, there are shown light redirecting arrangements 224, associated with the substrate 102, implemented as one or more diffractive optical elements (referred to interchangeably as diffractive gratings) for deflecting eye-tracking light toward an optical sensor 140, according to non-limiting embodiments of the present invention. Similar to the as in the embodiments described with reference to FIGS. 2-4, the light that is deflected toward the optical sensor 140 by the light redirecting arrangement 224 is unguided by the substrate 102.

Referring first to FIG. 5, the light redirecting arrangement 224 is implemented as a diffractive optical element deployed on one of the major surfaces 104 of the substrate 102. Similar to as described above with reference to FIG. 2, a proportion of the intensity of the reflected eye-tracking light (rays 132A, 132B, 132C), propagating in a general reflection direction, reaches the diffractive grating 224 and is deflected by the light redirecting arrangement 124 as deflected light (rays 138A, 138B, 138C), so as to redirect the light (rays 132A, 132B, 132C) in a general deflection direction toward the optical sensor 140. The deflection of the eye-tracking light by the light redirecting arrangement 224 occurs at the substrate 102, meaning that the point of deflection of the eye-tracking light is within the substrate 102 (as in FIG. 6), and/or is at or near one of the major surfaces of the substrate 102 (as in both of FIG. 5 and FIG. 6).

In this non-limiting example configuration, the diffractive grating 224 is deployed on the major surface 104 at or near the distal end of the substrate 102 and is in non-overlapping relation with the optical coupling-out configuration 120 (similar to as described with reference to FIG. 2). It should be noted, however, that other non-overlapping deployment locations of the diffractive grating 224 on the major surface 104 are possible, including at or near the proximal end of the substrate 102 (similar to as described with reference to FIG. 3). Further still, the diffractive grating 224 may be deployed on the major surface 104 so as to be in overlapping relation with the optical coupling-out configuration 120. For example, the diffractive grating 224 may be deployed along a part of the same portion of the major surface 104 along which the projection of one or more of the partially reflective surfaces 120 extends.

Similar to the light redirecting arrangement 124 (implemented as at least one partially reflective surface), the light redirecting arrangement 224 in certain deployment configurations is such that the eye-tracking light (rays 132A, 132B, 132C) that reaches the light redirecting arrangement 224 is deflected by the light redirecting arrangement 124 at a slant angle, meaning that the angle of the incoming light (rays 132A, 132B, 132C) to the light redirecting arrangement 224 measured relative to the surface 106 is different than the angle of deflected light (rays 138A, 138B, 138C). In certain instances, the angle of the incoming light measured relative to the surface 106 is steeper than the angle of the light deflected by the light redirecting arrangement 224.

It is noted that unlike the light redirecting arrangement 124, the eye-tracking is not refracted by the major surface 104 when the diffractive optical element is deployed on major surface 104. In the non-limiting implementation illustrated in FIG. 6, however, the diffractive grating is deployed on the major surface 106, such that the eye-tracking light is refracted by the major surface 104. Here, the light reflected from the eye 152 (e.g., light rays 132A, 132B, 132C)

propagating in a general reflection direction that is incident on the major surface 104 of the LOE 102 is refracted by the surface 104 as refracted light (rays 134A, 134B, 134C). The refracted light 134A, 134B, 134C is deflected by the diffractive grating 224 as deflected light (reflected light rays 136A, 136B, 136C) so as to impinge again on the major surface 104 of the LOE 102. The incident light (rays 136A, 136B, 136C) is refracted again by the surface 104 as refracted light (rays 138A, 138B, 138C), which propagates in free-space in a general deflection direction toward the optical sensor 140. It is noted that in the present embodiment, similar to as in the embodiments described with reference to FIGS. 2-4, the light from the eye 152 undergoes at most a single reflection within the substrate 102 prior to reaching the optical sensor 140, the single reflection being the reflection by the diffractive grating 224.

In the non-limiting example configuration illustrated in FIG. 6, the diffractive grating 124 is deployed at or near the distal end of the substrate 102 and is in non-overlapping relation with the optical coupling-out configuration 120 (similar to as described with reference to FIGS. 2 and 5). It should be noted, however, that other non-overlapping deployment locations of the diffractive grating 224 on the major surface 106 are possible, including at or near the proximal end of the substrate 102 (similar to as described with reference to FIG. 3). Further still, the diffractive grating 224 may be deployed on the major surface 106 so as to be in overlapping relation with the optical coupling-out configuration 120 (similar to as described with reference to FIG. 5).

Although a single continuous diffractive grating deployed along portions of the major surfaces 104 and 106 is illustrated in FIGS. 5 and 6, respectively, an array of diffractive optical elements (i.e., more than one diffractive grating) may be deployed in a discontinuous manner along a portion of at least one of the major surfaces 104, 106 of the substrate 102.

Similar to the light redirecting arrangement 124, the light redirecting arrangement 224 is preferably configured to deflect incoming light (rays 132A, 132B, 132C) that is incident to the major surface 104 at AOIs in the range of 18-40 degrees to deflection angles in the range of 60-90 degrees (where the deflection angles are measured between the rays 138A, 138B, 138C and the normal to the major surface 104).

Figure 7:
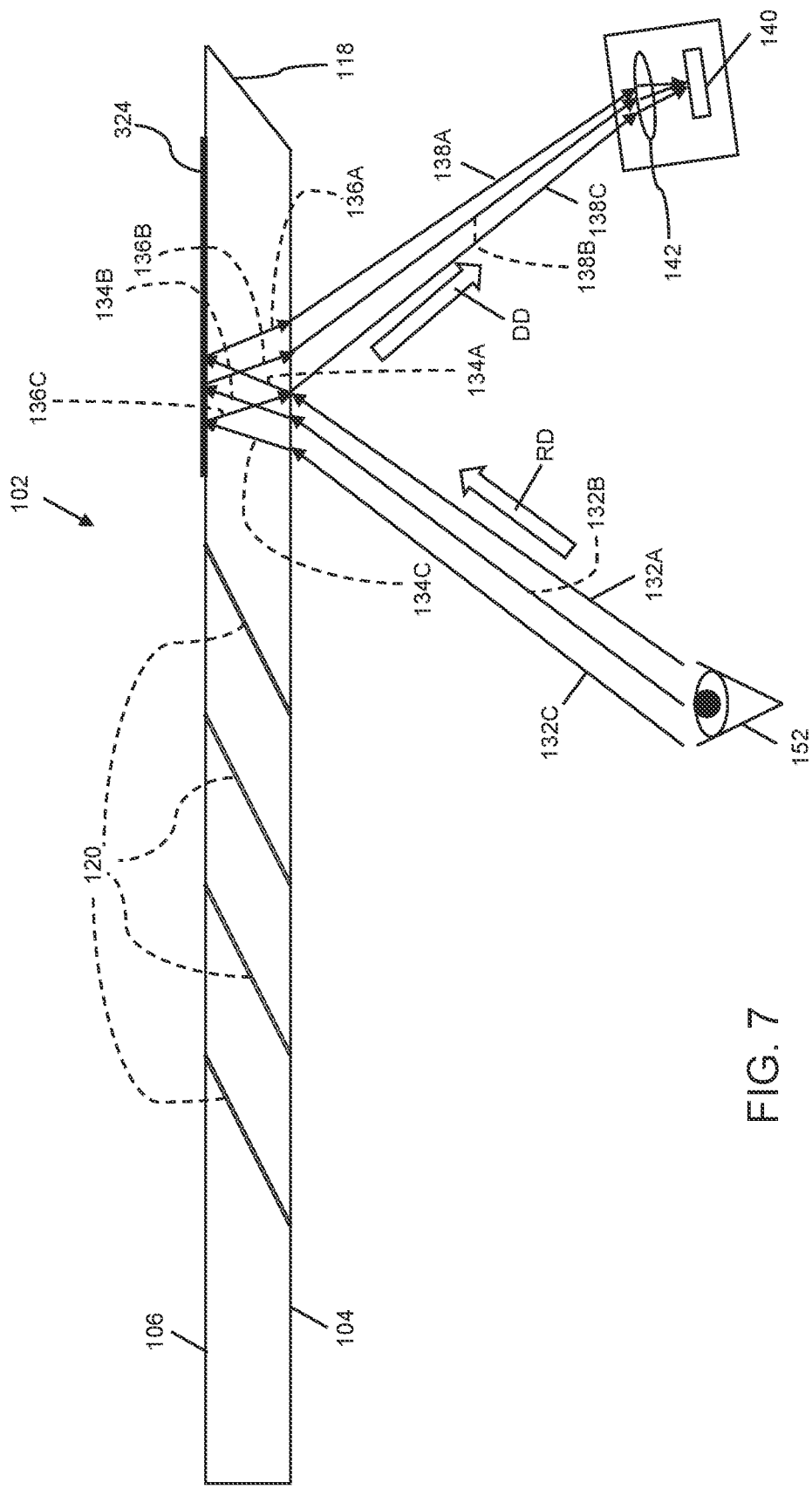
FIG. 7 is a schematic side view of an optical system, constructed and operative according to another embodiment of the present invention, for displaying an image via a light-guide optical element, and that includes an apparatus for tracking the gaze direction of a human eye using a light redirecting arrangement, implemented as a selectively reflective surface associated with a portion of one of the major surfaces of the light-guide optical element, that deflects light toward an optical sensor.

Referring now to FIG. 7, there is shown a light redirecting arrangement 324, associated with the substrate 102, for deflecting eye-tracking light toward an optical sensor 140 according to another non-limiting embodiment of the present invention. Similar to the as in the embodiments described with reference to FIGS. 2-6, the light that is deflected by the light redirecting arrangement 324 toward the optical sensor 140 is unguided by the substrate 102. In the present embodiment, the light redirecting arrangement 324 is implemented as a selectively reflective surface associated with at least a portion of one of the major surfaces 106 of the substrate 102 (i.e., the surface of the substrate 102 that is facing away from the eye 152). The selectively reflective surface is preferably formed from one or more layers of an optical coating, such as a dielectric and/or dichroic coating, that is applied to at least a portion of one of the major surfaces 106 of the substrate 102. In this implementation, eye-tracking light reflected from the eye propagates in a general reflection direction and is deflected at the substrate 102 (an in this example at the major surface 106) by the dielectric and/or dichroic coating. The dielectric and/or dichroic coating is designed to be highly transmissive to light in the photopic spectrum (i.e., light having wavelengths in the visible region of the electromagnetic spectrum) so as to enable the viewer to view the real-world scene through the substrate 102, and highly reflective to light having wavelengths in the eye-tracking spectrum (e.g., in the NIR region). A "hot mirror" is a special class of dielectric mirror having a dichroic filter which provides the requisite transmission and reflection characteristics of the light redirecting arrangement 324. A simple hot mirror can be deployed at the requisite region or portion of the major surface 106 via optical cement or mechanical attachment in order to form the light redirecting arrangement 324.

It is noted that in the present embodiment, similar to as in the embodiments described with reference to FIGS. 2-6, the light from the eye 152 undergoes at most a single reflection within the substrate 102 prior to reaching the optical sensor 140, the single reflection being the reflection by the optical coating (or coatings) used to implement the light redirecting arrangement 324.

The light redirecting arrangement 324 is preferably configured to deflect incoming light (rays 132A, 132B, 132C) that is incident to the major surface 104 at AOIs in the range of 18-40 degrees to deflection angles in the same angular range as the incident light (where the deflection angles are measured between the rays 138A, 138B, 138C and the normal to the major surface 104). The incident light angular range of 18-40 degrees corresponds to the angular distribution of the eye-tracking light that is reflected from the eye toward the light redirecting arrangement 124.

In certain embodiments, a chromatic selective reflective coating may also be applied to the region of the substrate 102 at which the light redirecting arrangement 324 is formed in order to support the above-mentioned angular distribution of incoming light and the angular range of deflected light.

In the non-limiting implementation illustrated in FIG. 7, the light redirecting arrangement 324 (hot mirror) is deployed on the major surface 106, such that the eye-tracking light is refracted by the major surface 104. Here, the light reflected from the eye 152 (e.g., light rays 132A, 132B, 132C), propagating in the general reflection direction, that is incident on the major surface 104 of the substrate 102 is refracted by the surface 104 as refracted light (rays 134A, 134B, 134C). The refracted light 134A, 134B, 134C is deflected by the hot mirror 324 as deflected light (reflected light rays 136A, 136B, 136C) so as to impinge again on the major surface 104 of the substrate 102. The incident light (rays 136A, 136B, 136C) is refracted again by the surface 104 as refracted light (rays 138A, 138B, 138C), which propagates in free-space in a general deflection direction toward the optical sensor 140.

The deflection of the eye-tracking light at the major surface 106 enables the optical sensor 140 (i.e., camera system) to be deployed closer to the major surface 104, thereby increasing the distance between the optical sensor 140 (i.e., camera system) and the eye 152 (and the EMB), providing a more comfortable viewing experience for the viewer.

In the non-limiting configuration illustrated in FIG. 7, the major surface 104 is preferably coated with an anti-reflection coating that reduces reflection of light in both the photopic spectrum (e.g., visible light region) and the eye-tracking spectrum (e.g., NIR region) so as to allow light from the external scene to pass through the surface 104 to reach the eye 152 of the viewer, and to allow eye-tracking light that is deflected by the light redirecting arrangement 324 to pass through the surface 104 (with possible refraction) to reach the optical sensor 140.

Although FIG. 7 illustrates an implementation of the light redirecting arrangement 324 deployed on at least a portion the surface 106 of the substrate 102 at or near the proximal end of the substrate 102, such an implementation is merely a non-limiting illustrative example of the light redirecting arrangement 324. Other non-limiting implementations are possible in which the light redirecting arrangement 324 is deployed on at least a portion of the major surface 104 at or near the proximal end of the substrate 102. In such an implementation, the light redirecting arrangement 324 is preferably implemented as a dielectric coating applied to at least a portion of the surface 104 (referred to as a "dielectric mirror"). In this implementation, the optical sensor 140 should be deployed further from the surface 104 than in the implementation illustrated in FIG. 7, so as to allow the optical sensor 140 to capture eye-tracking light covering a wide angular distribution. The implementation of the light redirecting arrangement 324 at the surface 104 is therefore less preferable than the implementation illustrated in FIG. 7, as the distance between the optical sensor 140 (i.e., camera system) and the eye 152 (and the EMB) is decreased as compared with the implementation illustrated in FIG. 7.

It is noted that the section of the major surface 104, 106 on which the light redirecting arrangement 324 is deployed may be a single continuous portion of the major surface 104, 106, or may be one or more discontinuous portions (i.e., separate segments) of the major surface 104, 106.

The non-limiting implementations of the light redirecting arrangement 324 described thus far have pertained to deployment of a reflective surface on a portion or portions of one of the surfaces 104, 106 at or near the proximal end of the substrate 102. The light redirecting arrangements 324 of these implementations are in non-overlapping relation with the optical coupling-out configuration 120 (similar to as described with reference to FIG. 3). It should be noted, however, that other non-overlapping deployment locations of the light redirecting arrangement 324 on one of the major surfaces 104, 106 are possible, including at or near the distal end of the substrate 102 (similar to as described with reference to FIGS. 2 and 5). Further still, the light redirecting arrangement 324 may be deployed on one of the major surfaces 104, 106 so as to be in overlapping relation with the optical coupling-out configuration 120. For example, the reflective surface may be deployed along a part of the same portion of the major surfaces 104, 106 along which the projection of one or more of the partially reflective surfaces 120 extends.

The light redirecting arrangements 124, 224, 324 according the various embodiments of the present invention may be deployed at or close to portions of the major surface 104 such that the eye-tracking light that is transmitted from the eye 152 to the light redirecting arrangements 124, 224, 324 is first incident on the portions of the major surface 104 at oblique angles (i.e., a relatively high AOI measured relative to the normal to the surface 104), and by equivalence shallow angles relative to the plane of the surface 104 (in embodiments in which the surface 104 is planar). This is most clearly illustrated in FIGS. 2, 5 and 6, in which the rays 132A, 132B, 132C (representative of the eye-tracking light transmitted from the eye 152 to the light redirecting arrangement) are incident at relatively high AOIs. The high AOI, and the reflection characteristics of the light redirecting arrangement (including, for example, the deployment angle of the partially reflective surfaces 124), lend to the deflected light (rays 138A, 138B, 138C) being at higher AOIs than the incoming light 132A, 132B, 132C.

Such deployment configurations of the light redirecting arrangements 124, 224, 324 allow placement of the optical sensor 140 (and focusing optics 142) at or close to the image projector 108, and in certain preferred embodiments attached to a mechanical body or housing that houses the components of the image projector 108.

The following paragraphs describe several of the deployment options for the illumination arrangement 126. Generally speaking, various configurations of the illumination arrangement 126 are contemplated herein. In all of the illumination arrangement configurations, the illumination arrangement 126 includes at least one light source configured to illuminate the EMB 154 (and hence the eye 152 when positioned in the EMB 154) with eye-tracking light, which in preferred but non-limiting implementations is in the NIR region of the electromagnetic spectrum.

In one non-limiting deployment configuration, the eye-tracking illumination may be incorporated as part of the image projected by the image projector 108. The illumination may be during image projection or in a separate time slot. The timing control of the eye-tracking illumination and the image projection is preferably controlled by the processing subsystem 146. Where the eye-tracking illumination is in the IR region, there are various options for providing the IR illumination to the eye. Where a wavelength of NIR close to visible wavelengths is used, IR illumination may be combined as a fourth "color" in the conventional visible image projector, for example, using an LCoS modulator. If patterned illumination is desired for longer wavelengths of IR, a digital light processing (DPL) device is typically preferred. For non-patterned illumination, a dedicated illumination source is typically provided independent of the image projector. The eye-tracking illumination, generated by the image projector, is coupled into the substrate 102 in the same manner as the visible image illumination 110, and propagates by internal reflection. The optical coupling-out configuration 120 is preferably configured to transmit light in the eye-tracking spectrum, while the light redirecting arrangement 124, 224, 324 is preferably configured to deflect light in the eye-tracking spectrum and transmit in the photopic spectrum. The desired reflection and transmission characteristics of the optical coupling-out configuration 120 may be achieved by applying appropriate coatings to the partially reflective surfaces 120. Similarly, the desired reflection and transmission characteristics of the light redirecting arrangement 124 may be achieved by applying appropriate coatings to the partially reflective surfaces 124.

Figure 8:
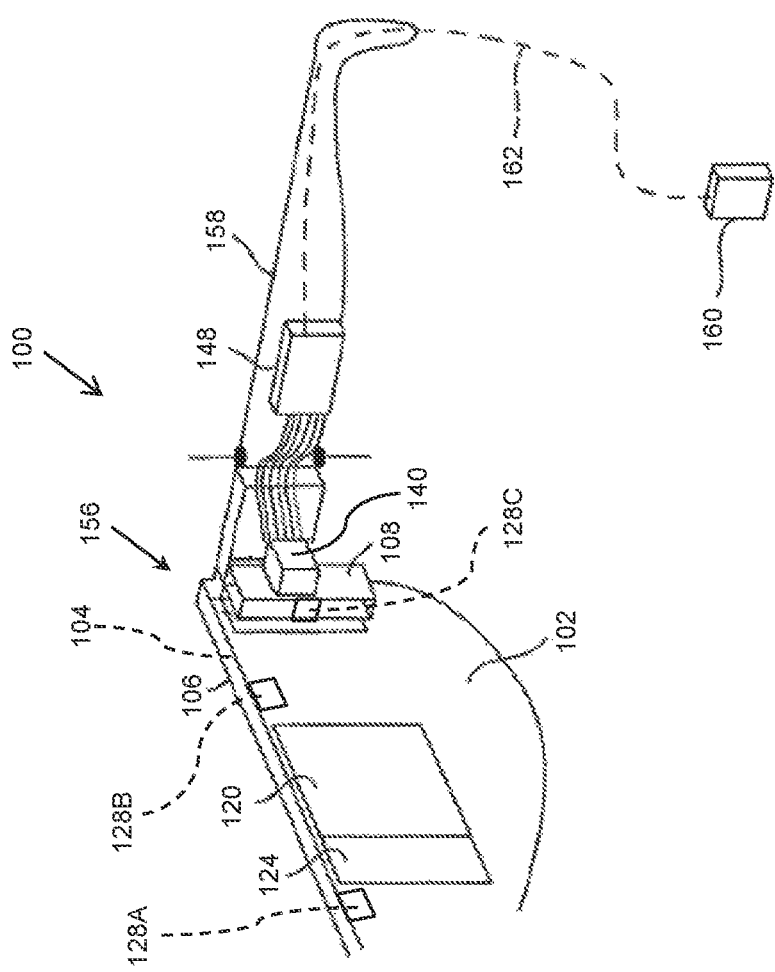
FIG. 8 is a partial schematic isometric view of the optical system of FIG. 2, implemented in an eye-glasses form factor.

In a more preferable deployment configuration, the illumination arrangement 126 is separate from the image projector, and includes one or more light sources deployed in proximity to the optical sensor 140 and/or about the periphery of a mechanical body of the optical system 100 to which the substrate 102 is attached. FIG. 8 shows such a preferred non-limiting example implementation in which the optical system 100 is implemented in an eye-glasses form factor with a head-mounted mechanical body implemented as an eye-glasses frame 156 with side arms 158 for engaging the ears of the observer (viewer). The optical system 100 is powered from a suitable electrical power source, which may be any combination of batteries and/or an external power source provided, illustrated here schematically as power source 160 connected via a cable 162. Where battery power is used, the batteries may be integrated as part of the eye-glasses or helmet-mounted structure. It should be noted that other form factors, such as helmet-mounted form factors, vehicle windshield form factors, and other head-up display and near-eye display form factors also clearly fall within the scope of the present invention.

In the present non-limiting implementation, the illumination arrangement 126 includes three separate light sources 128A, 128B, 128C (implemented, for example, as three LEDs). Two of the sources 128A, 128B are deployed at or near the optical coupling-out configuration 120, on a peripheral portion of the eye-glasses frame 156. The third light source 128C is deployed near the side of the observer's head in proximity to the optical sensor 140 (in FIG. 8 this is illustrated as being attached to the image projector 108 which is attached to the side arm 158).

In general, the illumination arrangement 126 may be configured to illuminate specific regions of the eye 152 or the entire eye 152 with eye-tracking light. As discussed above in detail, the eye-tracking light emitted by the illumination arrangement (rays 130A, 130B, 130C) is reflected by the eye 152 as reflected light 132A, 132B, 132C, and is deflected by the light redirecting arrangement 124, 224, 324 as deflected light (rays 138A, 138B, 138C) toward the optical sensor 140, where it is preferably focused (by the optics 142) onto the optical sensor 140. In certain non-limiting implementations, the deflected light (e.g., rays 138A, 138B, 138C) is focused by the focusing optics 142 onto different regions or portions of the optical sensor 140. The optical sensor 140 generates signals in response to sensing the focused light (e.g., corresponding to the image of eye), and those signals are transferred to the processing system 146 which is configured to process the signals to derive a current gaze direction of the eye 152. In certain non-limiting implementations, the optical system 100 obtains the gaze direction (the angular orientation of the eye, or line of sight of the eye) by imaging patterns that exist on specific regions of the eye 152. The position of such patterns and their motion are indicative of the current gaze direction and motion of the eye. The human eye includes various trackable features, including, for example, patterns generated by the nerves of the cornea (i.e., corneal nerve patterns) based on corneal reflections, the center of the eye pupil, and patterns generated by the blood vessels of the optic disc. These trackable features can be tracked using appropriate tracking algorithms implemented by suitable image processing instructions performed by the processing system 146. In certain non-limiting implementations, the processing system 146 computes the gaze direction based on the vector between the pupil center and the corneal reflections.

In general, all background illumination causes noise that degrades the quality of the eye image. In order to reduce the effects of external illumination sources (e.g., ambient light, natural sunlight, etc.) the illumination arrangement 126 may be configured to generate a short pulse of light (preferably below 1 ms), and the optical sensor 140 is synchronized (by the processing subsystem 146) to integrate light only during this short illumination duration. In this manner, continuous background illumination can be greatly suppressed. Additionally, or alternatively, a passband spectral filter may be deployed in the optical path from the light redirecting arrangement to the optical sensor 140 to obstruct light of wavelengths outside a given range of wavelengths within which the eye-tracking illumination is generated from reaching the optical sensor 140. The spectral filter may ideally be positioned between the focusing optics 142 and the optical sensor 140, but may alternatively be deployed before the focusing optics 142.

In a non-limiting process for deriving and tracking the gaze direction, the cornea pattern (optionally in combination with the optic disc pattern and/or pupil) is mapped and trackable features are determined during an initial setup process, and then a continuous tracking process is performed. For example, an image marker may be displayed to the observer for the observer to look at during an initialization. While the observer looks towards the marker, the illumination arrangement 126 fully illuminates the cornea and a full image of the cornea (and pupil) is obtained (via the optical sensor 140). This image is then processed by processing system 146 to identify trackable features (for example, the optic disc and the fovea). During the continuous tracking process, selected regions of interest (ROI) of the eye 152 are selectively illuminated by the illumination arrangement 126, and an image of the ROI (obtained by the optical sensor 140) is sampled and processed (by the processing system 146) during the corresponding illumination pulse to determine the current gaze direction (line of sight), and this derived gaze direction is used to update the position of the ROI for the subsequent illumination cycle, and the continuous tracking process repeats by illuminating the updated ROI. Assuming that the frequency of the tracking measurements is high compared to the speed of motion of the eye, this update process is typically effective to maintain continuous tracking, optionally combined with tracking information from the other eye. As the gaze direction changes, so does the illumination area. Updating of the ROI may be performed according to the "current" gaze direction as determined from the last sampled image or, in certain cases, may use predictive extrapolation based on eye motion between the previous two or more measurements. In the event that tracking fails, the size of the illuminated region can be temporarily increased until the trackable features are recovered.

The light sources of the illumination arrangement 126 may be configured to emit eye-tracking light at approximately the same or different center wavelengths within the eye-tracking spectrum. Typically, in the NIR region the dispersion of glass materials from which the substrate 102 can be constructed is sufficiently low so to avoid suffering from distortion within the spectral width of a single eye-tracking light source (the spectral width typically being in the range of 20-50 nm for LEDs). However, employing light sources that emit eye-tracking light at two spectrally separated center wavelength (while still being within the same region of the eye-tracking electromagnetic spectrum), may provide certain advantages when imaging the eye. For example, deploying the illumination arrangement 126 with a first and a second light source that emit light centered around approximately 700 nm and 950 nm, respectively, can result in two different images of the eye, shifted one relative to the other, formed on the optical sensor 140. By applying appropriate image processing algorithms, such as correlation algorithms, the processing subsystem 146 may achieve higher resolution in the gaze direction calculations.

It is noted that the processing subsystem 146 and the camera (optical sensor with focusing optics) are preferably deployed in close proximity to each other, for example as shown in FIG. 8, to enable simple electrical connection between the optical sensor and the processing subsystem 146 (e.g., short electrical wiring or cabling). It is further noted that the light redirecting arrangements of the present invention are deployed so as to deflect light in a general deflection direction corresponding to the region or area in which the camera is deployed. As mentioned above, the focusing optics 142 defines a field of view corresponding to the region from which the deflected eye-tracking light will arrive. Hence, the focusing optics 142 is deployed to capture light from the deflection direction. In the non-limiting example implementation illustrated in FIG. 8, the focusing optics 142 is deployed at a right side of the eye-glasses frame 156 so as to capture deflected eye-tracking light emanating from a region to the left of the focusing optics 142. Accordingly, the light redirecting arrangement of FIG. 8 should be deployed so as to deflect light in a general deflection direction to the right (i.e., toward the focusing optics 142). However, the light redirecting arrangement can be configured to deflect light in a general deflection direction to the left, so long as the focusing optics is deployed correspondingly. In FIG. 8, this would entail positioning the focusing optics on the left side of the eye-glasses frame 156, attached (directly or indirectly) to the left sidearm (not shown). Since the processing subsystem 146 preferably also controls the image projector 108, it could be advantageous to keep the processing subsystem 146 in proximity to the image projector 108 while sacrificing the proximity to the camera, and instead deploying a longer electrical connection between the optical sensor and the processing subsystem 146.

The general deflection direction associated with the light redirection arrangements can easily be changed from right-going to left-going (and vice versa) by changing the deployment orientation and/or optical parameters of the light redirecting arrangement. For example, looking at the general right-going deflection direction of the partially reflective surfaces 124 in FIG. 2, a general left-going deflection direction can be achieved by rotating the partially reflective surfaces 124 180-degrees about the vertical or horizontal axis so as to change the orientation of the partially reflective surfaces 124. In another example, the periodic structure used to form the diffractive grating 224 may be inverted or rotated to change the deflection direction.

Returning now to FIGS. 2-7, any pair of the light redirection arrangements 124, 224, 324 can be used in combination so as to be able to obtain two independent images of the eye 152 using a single optical sensor 140. Preferably, the two light redirecting arrangements are deployed at different respective portions of the substrate 102. For example, one light redirecting arrangement may be deployed at or near the proximal end of the substrate 102, while another light redirecting arrangement may be deployed at or near the distal end of the substrate 102. The two light redirecting arrangements may be of the same type (e.g., both implemented as partially reflective surfaces) or may be of different types (e.g., one may be implemented as a set of partially reflective surfaces and the other may be implemented as one or more diffractive grating).

Figure 9:
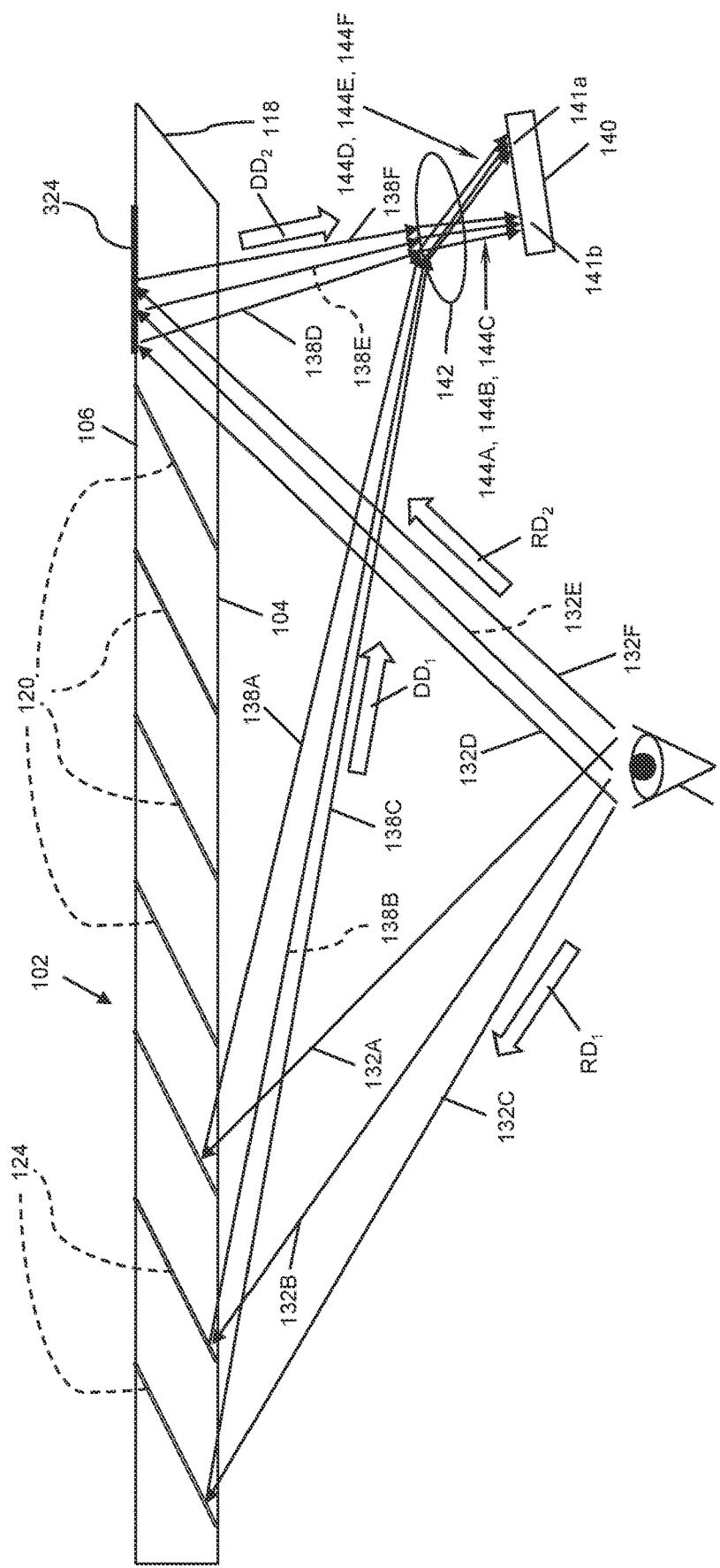
FIG. 9 is a schematic side view of an optical system, constructed and operative according to another embodiment of the present invention, combining two light redirecting arrangements that independently deflect light toward an optical sensor.

FIG. 9 shows a schematic illustration of a non-limiting example of an optical system having two different light redirecting arrangements. In the non-limiting illustrative example, the first light redirecting arrangement 124 is implemented similar to as described with reference to FIG. 2, and the second light redirecting arrangement 324 is implemented similar to as described with reference to the FIG. 7. The traversal of light from the eye to the optical sensor 140 is schematically illustrated in FIG. 9. For simplicity, the refraction of the eye-tracking light by the major surface 104 is not shown in the figure, but it should be understood that refractions of the eye-tracking light may occur similar to as described with reference to FIGS. 2 and 7.

Eye-tracking illumination is reflected from the eye 152, represented schematically by light rays 132A, 132B, 132C, 132D, 132E, 132F. Some of the eye-tracking light reflected by the eye, represented schematically by a first set of light rays 132A, 132B, 132C, propagates in a first general reflection direction (represented schematically by the thick arrow labeled "$RD_1$") and is deflected by the light redirecting arrangement 124 as deflected light (represented schematically by light rays 138A, 138B, 138C) in a first general deflection direction (represented schematically by the thick arrow labeled "$DD_1$"). Some of the eye-tracking light reflected by the eye, represented schematically by a second set of light rays 132D, 132E, 132F, propagates in a second general reflection direction (represented schematically by the thick arrow labeled "$RD_2$") and is deflected by the light redirecting arrangement 324 as deflected light (represented schematically by light rays 138D, 138E, 138F) in a second general deflection direction (represented schematically by the thick arrow labeled "$DD_2$"). The deflected light, in the form of the two sets of deflected light rays, reach the focusing optics 142. The focusing optics 142 converts the first set of deflected incoming light 138A, 138B, 138C into converging beams of light (represented schematically as light rays 144A, 144B, 144C) that impinge on a first portion or region, designated 141a, of the optical sensor 140 so as to form a first image of the eye 152 within the EMB. The focusing optics 142 also converts the second set of deflected incoming light 138D, 138E, 138F into converging beams of light (represented schematically as light rays 144D, 144E, 144F) that impinge on a second portion or region, designated 141b, of the optical sensor 140 so as to form a second image of the eye 152 within the EMB.

FIG. 10 shows two independent images captured by a single optical sensor 140 using two light redirecting arrangement in a laboratory simulation.

It is noted that the processing subsystem 146 may process the signals generated by the optical sensor 140, when generating two independent images of the eye, to calculate or estimate the eye relief distance using triangulation techniques. It is also noted that, in principle, more than two light redirecting arrangements can be used in combination to generate a set of more than two independent images of the eye.

Certain embodiments of the present disclosure may be of particular value when deployed as part of a head-up display (HUD) in a vehicle or an aircraft, whereby the display of images projected by the image projector 108 in automotive or aviation environments may be dependent or controlled, at least in part, by the eye gaze direction of the user of the HUD. In an automotive environment, a HUD employing the major components of the eye tracking apparatus according to the disclosed embodiments may be installed in front of the driver of the vehicle, for example integrated into the dashboard or front windshield of the vehicle. In aviation environments, the HUD may be installed in front of the pilot of the aircraft, for example installed as part of a pilot helmet in a front region of the helmet.

The embodiments of the optical system have thus far been described within the context of a substrate 102 being a light-guide optical element (LOE) configured to guide image light (injected from an image projector 108) by internal reflection. Such embodiments are of particular value when used in AR and/or VR applications, where the AR/VR image is produced by a compact image projector having a small aperture that is multiplied by the LOE to generate a large aperture. As discussed in the background section, aperture multiplication in one dimension has been developed based on a parallel-faced slab of transparent material within which the image propagates by internal reflection. It is noted that aperture multiplication in two dimensions has also been developed using various optical waveguide configurations. In one example configuration, two-dimensional aperture expansion is effectuated by way of first and second optical waveguides. The first optical waveguide has two pairs of parallel major external surfaces that form a rectangular cross-section. A first set of mutually parallel partially reflective surfaces traverse the first optical waveguide oblique to a direction of elongation of the optical waveguide. The second optical waveguide, optically coupled to the first optical waveguide, has a pair of parallel major external surfaces forming a slab-type waveguide. A second set of mutually parallel partially reflective surfaces traverse the second optical waveguide oblique to the major external surfaces of the second optical waveguide. In addition, the planes containing the first set of partially reflective surfaces are preferably oblique to the planes containing the second set of partially reflective surfaces. The optical coupling between the two optical waveguides, and the deployment and configuration of the two sets of partially reflective surfaces are such that, when an image is coupled into the first optical waveguide with an initial direction of propagation at a coupling angle oblique to both pairs of parallel major external surfaces of the first optical waveguide, the image advances by four-fold internal reflection along the first optical waveguide (i.e., in two dimensions), with a proportion of intensity of the image reflected at the first set of partially reflective surfaces so as to be coupled out of the first optical waveguide and into the second optical waveguide, and then propagates through two-fold internal reflection within the second optical waveguide (i.e., in one dimension), with a proportion of intensity of the image reflected at the second set of partially reflective surfaces so as to be coupled out of the second optical waveguide as a visible image seen by the eye of an observer. When implementing the light redirecting arrangement as a set of parallel planar partially reflective surfaces 124, the planes of the partially reflective surfaces 124 may be oriented to be parallel, orthogonal or oblique to the planes of the first or second sets of mutually parallel partially reflective surfaces. Further details of two-dimensional aperture multipliers can be found in various patent documents, including, for example, U.S. Pat. No. 10,564,417, which is incorporated by reference in its entirety herein.

In another example configuration, two-dimensional aperture expansion is effectuated by way of first and second slab-type optical waveguides. The first optical waveguide has two pairs of parallel major external surfaces forming a slab-type waveguide. A first set of mutually parallel internal partially reflective surfaces traverse the first optical waveguide at an oblique angle to the two pairs of parallel major external surfaces. The second optical waveguide also has two pairs of parallel major external surfaces. A second set of mutually parallel internal partially reflective surfaces traverse the second optical waveguide at an oblique angle to the two pairs of parallel major external surfaces of the second optical waveguide. In addition, the planes containing the first set of partially reflective surfaces are oblique or perpendicular to the planes containing the second set of partially reflective surfaces. The optical coupling between the two optical waveguides, and the deployment and configuration of two sets of partially reflective surfaces are such that, when an image is coupled into the first optical waveguide, the image propagates through two-fold internal reflection within the first optical waveguide between the external surfaces of one of the pairs of external surfaces in a first guided direction, with a proportion of intensity of the image reflected at the first set of partially reflective surfaces so as to be coupled out of the first optical waveguide and into the second optical waveguide, and then propagates through two-fold internal reflection within the second optical waveguide between the external surfaces of one of the pairs of external surfaces of the second optical waveguide in a second guided direction (oblique to the first guided direction), with a proportion of intensity of the image reflected at the second set of partially reflective surfaces so as to be coupled out of the second optical waveguide as a visible image seen by the eye of an observer. When implementing the light redirecting arrangement as a set of parallel planar partially reflective surfaces 124, the planes of the partially reflective surfaces 124 may be oriented to be parallel, orthogonal or oblique to the planes of the first or second sets of mutually parallel partially reflective surfaces. Further details of two-dimensional aperture multipliers can be found in various patent documents, including, for example, U.S. Pat. No. 10,551,544, which is incorporated by reference in its entirety herein.

It is further noted that although the apparatus for deriving eye gaze direction may also be of value when used in non-AR or non-VR applications. In one set of additional applications, the apparatus for deriving gaze direction can be used to advantage in combination with assemblies having any type of substrate formed from a material deployed in front of the eye of a viewer that can at least partially transmit light. The "substrate" in such assemblies may include, but are not limited to, sunglasses, eye-glasses, eye-glasses with optical diopter, eye-glasses with a diffractive grating or gratings, and eye protection gear having a shield or dome type structure formed from plastic or glass deployed to protect the eye from debris or particulates. Some or all of the major external surfaces of the aforementioned substrates may be curved surfaces, unlike the major external surfaces of the LOE which are flat planar surfaces.

In another set of additional applications, the apparatus for deriving gaze direction can be used to advantage in combination with computer or mobile device related applications in which the gaze direction of a user's eye may be used to navigate a display screen, webpage, menu or the like, or may be used to interact with a computerized game played on a computer device (e.g., video game system, mobile device, laptop computer, table, etc.). In such applications, the "substrate" may include the display screen of the computer device, and the light redirecting arrangement can be appropriately associated with portions of the display screen so as to deflect eye-tracking light that is reflected from the eye toward the display screen.

Figure 12:
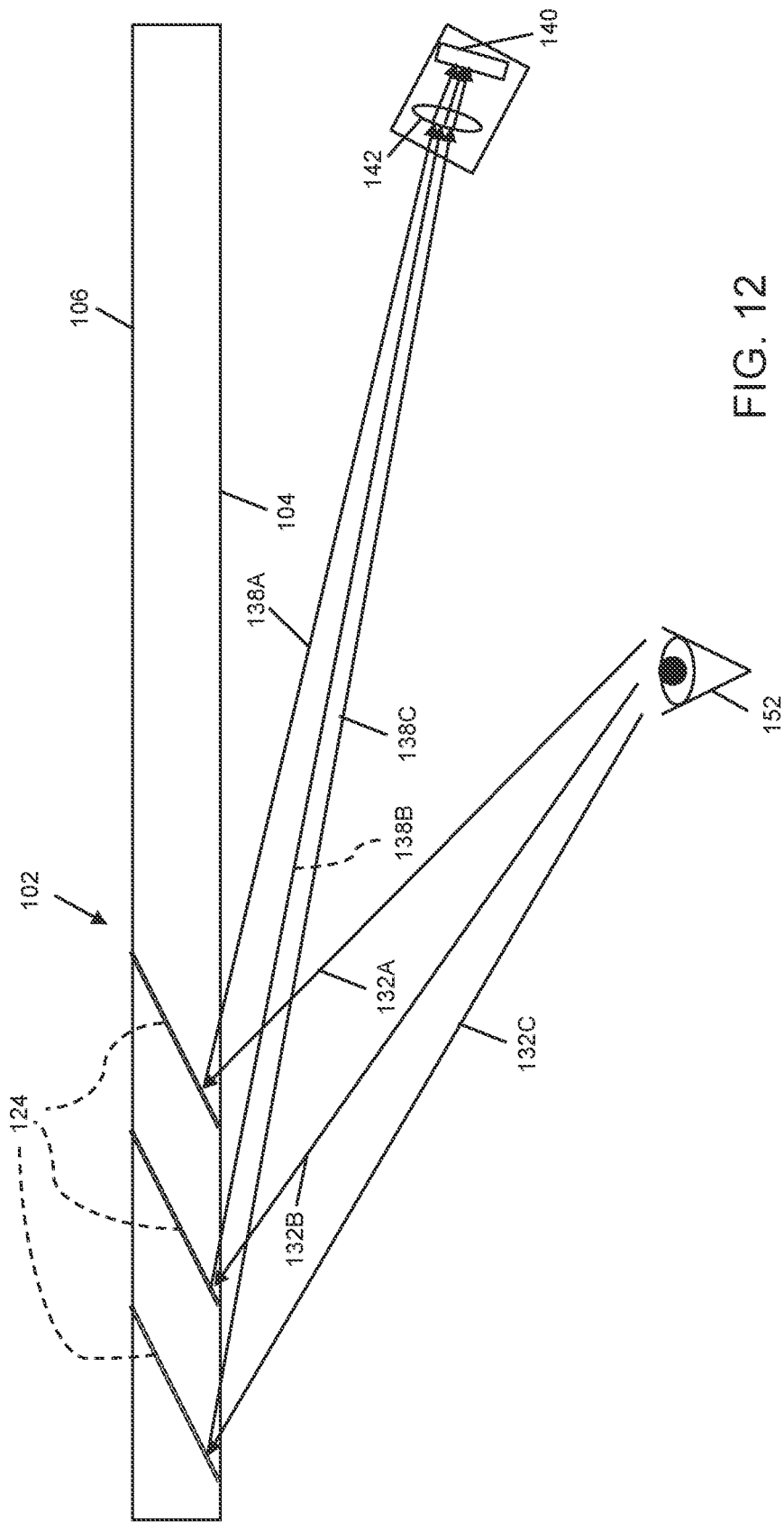
FIG. 12 is a schematic side view of an optical system, constructed and operative according to an embodiment of the present invention, having an apparatus for tracking the gaze direction of a human eye using a light redirecting arrangement, implemented as a set of partially reflective surfaces associated with a light-transmitting substrate, that deflects light toward an optical sensor.

FIG. 12 schematically illustrates an embodiment of the present invention that can be used in non-AR/VR applications described above. Here, the substrate 102 is formed from a light-transmitting material that forms part of one of the types of assemblies mentioned above, and is not configured to guide light by internal reflection. Moreover, since light is not guided by the substrate 102, there is not optical coupling-out configuration associated with the substrate 102. Instead, only a light redirecting arrangement, in this example implemented as a set of partially reflective surfaces 124, is associated with the substrate 102. The light redirecting arrangement 124 deflects incoming eye-tracking light (schematically represented by light rays 132A, 132B, 132C) as deflected light (schematically represented by light rays 138A, 138B, 138C) in a deflection direction toward the optical sensor 140. It is noted that for simplicity, the refraction of the eye-tracking light 132A, 132B, 132C by the major surface 104 is not shown in the figure, but it should be understood that refractions of the eye-tracking light may occur similar to as described with reference to FIGS. 2 and 7.

As should be understood, the embodiment illustrated in FIG. 12 can be implemented using any of the light redirecting arrangements 124, 224, 324, either alone or in paired combination, as described above. In such non-AR/VR applications, the EMB is generally defined as the two-dimensional area, positioned at or within a given distance from the surface 104 of the substrate 102, such that when the eye is positioned within the EMB the optical sensor 140 can sense light from the eye that is deflected by the light redirecting arrangement 124, 224, 324, and can preferably image portions of the eye.

Although the embodiments of the present disclosure as described thus far have pertained to illuminating the eye 152 within the EMB with eye-tracking light that is preferably in the non-visible region of the electromagnetic spectrum (preferably the NIR region), other embodiments are possible in which the eye is illuminated with light having wavelength outside of the NIR region, including, for example visible light and ultraviolet (UV) light. In embodiments in which the illumination arrangement 126 illuminates the eye with visible light, it may be advantageous to deploy the illumination source(s) to concentrate illumination on regions of the eye that are less sensitive to visible light, such as the sclera, so as to refrain from bombarding the eye with nonimage visible light. In embodiments in which the illumination arrangement 126 illuminates the eye with UV light, precautions should be taken to lessen or minimize the exposure of the eye to harmful UV radiation, for example by placing limits on the intensity/power of the UV beam received on a region of the eye of a given area over a given duration (for example less than 1 milliwatt per square centimeter for periods greater than 1000 seconds for UV light having wavelength in the range of 315 nm-400 nm).

It is also noted that the light sources of the illumination arrangement 126 may be configured to emit light in two or more different regions of the electromagnetic spectrum. For example, a first set (i.e., one or more) of light sources may emit light in the NIR region, while a second set of light sources may emit light in the visible region (preferably focused on the sclera).

According to certain non-limiting implementations, the various eye-tracking apparatus of the present disclosure may be duplicated for tracking both eyes of a subject simultaneously. In addition, when the eye-tracking apparatus is integrated as part of an optical system that also projects images to the eye, the optical system may be duplicated for projecting images to both eyes. By combining data from two eye trackers, it may be possible to achieve enhanced stability and continuity of tracking. For example, while the eyes are moving, the trackable portions of the eyes may be visible to the tracker in one eye and not the other. If a tracking algorithm is used which employs tracking of trackable features, simultaneous tracking for both eyes allows the tracking to be maintained continuously through periods in which only one eye-tracker can track the blind spot.

Where an optical system is binocular, each eye has its own image projection and eye tracking device, and various processing and power-supply components may optionally be shared between the two eye-tracking systems. The eye-tracking information gleaned by the binocular eye-tracking devices can be fused in order to provide enhanced stability and continuity of tracking, as mentioned above.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An optical system, comprising:
   a light-transmitting substrate having at least two parallel major surfaces deployed with a first of the major surfaces in facing relation to an eye of a viewer, the light transmitting substrate configured to guide image illumination, corresponding to an image collimated to infinity, by internal reflection between the two major surfaces of the light-transmitting substrate;
   at least two first internal surfaces located within the light-transmitting substrate obliquely inclined relative to the two major surfaces, the at least two first internal surfaces being flat, mutually parallel, partially reflective surfaces for coupling the guided image illumination out of the light-transmitting substrate to the eye of the viewer;
   an optical sensor deployed for sensing light;
   a light redirecting arrangement including at least one second internal surface located within the light-transmitting substrate obliquely inclined relative to the two major surfaces, the at least one second internal surface being a flat partially reflective surface configured to deflect light from the eye toward the optical sensor such that the deflected light that reaches the optical sensor is unguided by the light-transmitting substrate, and wherein the deflecting of light by the light redirecting arrangement occurs at the light-transmitting substrate; and at least one processor electrically coupled to the optical sensor and configured to process signals from the optical sensor to derive a current gaze direction of the eye.

2. The optical system of claim 1, further comprising:
an illumination arrangement deployed to illuminate the eye with light such that the eye reflects a proportion of the light from the illumination arrangement as reflected light, wherein the reflected light corresponds to the light from the eye that is deflected by the light redirecting arrangement.

3. The optical system of claim 2, wherein the illumination arrangement includes at least a first source of light and a second source of light, wherein the first source of light is configured to produce light having wavelengths in a given first range of wavelengths, and wherein the second source of light is configured to produce light having wavelengths in a given second range of wavelengths, the given first range of wavelengths and given second range of wavelengths being non-overlapping ranges.

4. The optical system of claim 1, wherein the at least two first internal surfaces and the at least one second internal surface are parallel to each other.

5. The optical system of claim 1, wherein the at least two first internal surfaces and the at least one second internal surface are non-parallel to each other.

6. The optical system of claim 1, wherein the at least two first internal surfaces are deployed in non-overlapping relation to the at least one second internal surface.

7. The optical system of claim 1, wherein the at least two first internal surfaces are deployed in overlapping relation to the at least one second internal surface.

8. The optical system of claim 1, wherein the light redirecting arrangement deflects a first set of light rays from the eye through an imaging lens toward the optical sensor so as to form a first image of at least a portion of the eye, and wherein the optical system further comprises: a second light redirecting arrangement configured to deflect a second set of light rays from the eye through the imaging lens toward the optical sensor so as to form a second image of at least a portion of the eye.

9. The optical system of claim 1, further comprising:
at least one imaging optical element deployed in an optical path from the light redirecting arrangement to the optical sensor for forming at least one image of at least a portion of the eye on the optical sensor.

10. An optical system, comprising:
an optical sensor deployed for sensing light;
a light redirecting arrangement associated with a light-transmitting substrate having at least two parallel major surfaces deployed with a first of the major surfaces in facing relation to an eye of a viewer, the light transmitting substrate configured to guide image illumination, corresponding to an image collimated to infinity, by internal reflection between the two major surfaces of the light-transmitting substrate and having at least two first internal surfaces located within the light-transmitting substrate obliquely inclined relative to the two major surfaces, the at least two first internal surfaces being flat, mutually parallel, partially reflective surfaces for coupling the guided image illumination out of the light-transmitting substrate to the eye of the viewer, wherein the light redirecting arrangement includes at least one second internal surface located within the light-transmitting substrate obliquely inclined relative to the two major surfaces, the at least one second internal surface being a flat partially reflective surface configured to deflect light from the eye toward the optical sensor such that the deflected light that reaches the optical sensor is unguided by the light-transmitting substrate, and wherein the deflecting of light by the light redirecting arrangement occurs at the light-transmitting substrate; and at least one processor electrically coupled to the optical sensor and configured to process signals from the optical sensor to derive a current gaze direction of the eye.

11. An optical system, comprising:
an illumination arrangement deployed to illuminate an eye motion box with eye-tracking light, the eye motion box defining a location of an eye of a viewer relative to a light-transmitting substrate having at least two parallel major surfaces deployed with a first of the major surfaces in facing relation to the eye, a proportion of intensity of the eye-tracking light being reflected by the eye as reflected light, the light transmitting substrate configured to guide image illumination, corresponding to an image collimated to infinity, by internal reflection between the two major surfaces of the light-transmitting substrate and having at least two first internal surfaces located within the light-transmitting substrate obliquely inclined relative to the two major surfaces, the at least two first internal surfaces being flat, mutually parallel, partially reflective surfaces for coupling the guided image illumination out of the light-transmitting substrate to the eye of the viewer;

an optical sensor deployed for sensing light;
a light redirecting arrangement including at least one second internal surface located within the light-transmitting substrate and obliquely inclined relative to the two major surfaces, the at least one second internal surface being a flat partially reflective surface configured to deflect the reflected light toward the optical sensor, wherein the deflected light that reaches the optical sensor is unguided by the light-transmitting substrate, and wherein the deflecting of light by the light redirecting arrangement occurs at the light-transmitting substrate; and at least one processor electrically coupled to the optical sensor and configured to process signals from the optical sensor to derive a current gaze direction of the eye.

12. The optical system of claim 1, wherein the at least one second internal surface includes a plurality of mutually parallel partially reflective surfaces.

13. The optical system of claim 8, wherein the second light deflecting arrangement includes a selectively reflective surface associated with at least a portion of one of the major surfaces of the light-transmitting substrate.

14. The optical system of claim 1, wherein the image illumination is in the visible light region of the electromagnetic spectrum and the light from the eye that is deflected by the light redirecting arrangement is outside of the visible light region of the electromagnetic spectrum, and wherein the at least one second internal surface transmits light in the visible light region of the electromagnetic spectrum and reflects light outside of the visible light region of the electromagnetic spectrum.

15. The optical system of claim 1, wherein the light from eye is incident to the at least one second internal surface at a first angle measured relative to the normal to the two major surfaces, and wherein the at least one second internal surface is deployed within the light-transmitting substrate at an oblique angle relative to the two major surfaces such that the light from the eye is deflected by the at least one second internal surface at a second angle measured relative to the normal to the two major surfaces that is different from the first angle.

16. The optical system of claim 15, wherein the oblique angle is between 10 and 35 degrees.

17. The optical system of claim 15, wherein the first angle is between 18 and 40 degrees, and wherein the second angle is between 60 and 90 degrees.

18. The optical system of claim 1, wherein the light from the eye includes light from a horizontal field and light from a vertical field, and wherein the at least one second internal surface is dimensioned and deployed within the light-transmitting substrate at an oblique angle relative to the two major surfaces such that the light redirecting arrangement deflects a wider angular range of light from the eye coming from the horizontal field than from the vertical field.

* * * * *